(12) United States Patent
Park et al.

(10) Patent No.: US 12,530,777 B2
(45) Date of Patent: Jan. 20, 2026

(54) SEMANTIC SEGMENTATION METHOD AND SYSTEM

(71) Applicant: SAMSUNG SDS CO., LTD., Seoul (KR)

(72) Inventors: Do Young Park, Seoul (KR); Sun Jin Kim, Seoul (KR); Min Kyu Kim, Seoul (KR); Reddy Yarram Naresh, Seoul (KR); Yu Min Lim, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 295 days.

(21) Appl. No.: 18/230,765

(22) Filed: Aug. 7, 2023

(65) Prior Publication Data
US 2024/0054652 A1 Feb. 15, 2024

(30) Foreign Application Priority Data
Aug. 11, 2022 (KR) .......................... 10-2022-0100409

(51) Int. Cl.
*G06T 7/11* (2017.01)
*G06T 7/194* (2017.01)
(Continued)

(52) U.S. Cl.
CPC .............. *G06T 7/11* (2017.01); *G06T 7/194* (2017.01); *G06V 10/40* (2022.01); *G06V 10/761* (2022.01);
(Continued)

(58) Field of Classification Search
CPC . G06T 2207/20084; G06T 2207/20081; G06T 7/11; G06T 7/0012; G06T 2207/10016; G06T 7/70; G06T 2207/30196; G06T 2207/10028; G06T 7/194; G06T 2200/24; G06T 7/73; G06T 2207/10081; G06T 2207/10088; G06T 2207/10024; G06T 11/60; G06T 2207/30096; G06T 7/10; G06T 2207/20016; G06T 5/77;
(Continued)

(56) References Cited

U.S. PATENT DOCUMENTS 10,963,754 B1  3/2021 Ravichandran et al.
2018/0108137 A1* 4/2018 Price ...................... G06N 3/045
(Continued)

FOREIGN PATENT DOCUMENTS

CN  110175588 A  8/2019
CN  110288024 B  8/2021
(Continued)

*Primary Examiner* — Alex Kok S Liew
(74) *Attorney, Agent, or Firm* — Sughrue Mion, PLLC

(57) ABSTRACT

A semantic segmentation method performed by at least one computing device is provided. The method may include extracting a plurality of support features, which include a first-level feature and a second-level feature, from a support image; generating a plurality of prototypes for a class associated with the support image, based on the plurality of support features; and predicting a segmentation mask for a query image using the plurality of prototypes, wherein the plurality of prototypes comprise a first prototype generated based on the first-level feature and a second prototype generated based on the second-level feature.

20 Claims, 25 Drawing Sheets

(51) Int. Cl.
*G06V 10/40* (2022.01)
*G06V 10/74* (2022.01)
*G06V 10/764* (2022.01)
*G06V 10/82* (2022.01)

(52) U.S. Cl.
CPC .......... *G06V 10/764* (2022.01); *G06V 10/82* (2022.01); *G06T 2207/20081* (2013.01); *G06T 2207/20084* (2013.01)

(58) Field of Classification Search
CPC ......... G06T 2207/20021; G06T 19/006; G06T 2207/20076; G06T 2207/20104; G06T 5/60; G06T 7/75; G06T 7/174; G06T 7/50; G06T 5/70; G06T 19/20; G06T 2207/10056; G06T 2207/10116; G06T 2210/12; G06T 3/4046; G06T 7/001; G06T 11/00; G06T 2207/30232; G06T 2207/30252; G06T 5/50; G06T 7/12; G06T 9/002; G06T 2207/20092; G06T 2207/30016; G06T 7/0006; G06T 7/0014; G06T 2207/20221; G06T 2207/30024; G06T 7/62

See application file for complete search history.

(56) References Cited

U.S. PATENT DOCUMENTS

| | | | |
|---|---|---|---|
| 2021/0243362 A1* | 8/2021 | Castillo | H04N 23/635 |
| 2022/0230322 A1* | 7/2022 | Dong | G06V 10/26 |
| 2022/0261593 A1* | 8/2022 | Yu | G06N 3/088 |
| 2022/0351379 A1* | 11/2022 | Lorsakul | G06T 7/0012 |

FOREIGN PATENT DOCUMENTS

| | | |
|---|---|---|
| CN | 114328921 A | 4/2022 |
| KR | 10-2021-0113738 A | 9/2021 |
| KR | 10-2022-0074087 A | 6/2022 |

* cited by examiner

SEMANTIC SEGMENTATION METHOD AND SYSTEM

CROSS-REFERENCE TO RELATED APPLICATION(S)

This application claims priority from Korean Patent Application No. 10-2022-0100409, filed on Aug. 11, 2022, in the Korean Intellectual Property Office, the disclosure of which is incorporated herein in its entirety by reference.

BACKGROUND

1. Field

The present disclosure relates to a semantic segmentation method and system.

2. Description of the Related Art

Semantic segmentation is a task of performing class classification on a pixel-by-pixel basis rather than on an image-by-image basis. It is known as a highly difficult task among various tasks in the field of machine learning. Since semantic segmentation is a task of performing pixelwise prediction, it is also referred to as 'dense prediction' in some cases.

Semantic segmentation is usually performed by a deep learning model. Therefore, a large image set and a precise label (i.e., a correct segmentation mask) are required to train the model. Hence, it is quite difficult to build a deep learning model that performs semantic segmentation in a domain in which only a small labeled image set exists (a so-called 'few-shot environment').

A deep learning model for semantic segmentation (e.g., a convolutional neural network (CNN)-based model) is generally composed of a plurality of layers (i.e., the depth of the model is quite deep). Therefore, a feature map of a final layer inevitably has a fairly large receptive field (i.e., region of an input image corresponding to each pixel of the feature map). However, when this feature map is used, segmentation accuracy for a narrow object region (e.g., a narrow part (such as an arm/leg) of the entire object region) in an image is low.

SUMMARY

Aspects of the present disclosure provide a method of accurately performing semantic segmentation even in a domain (environment) in which a small labeled image set exists and a system for performing the method.

Aspects of the present disclosure also provide a method of performing semantic segmentation with high accuracy even for a narrow object region in an image and a system for performing the method.

However, aspects of the present disclosure are not restricted to the one set forth herein. The above and other aspects of the present disclosure will become more apparent to one of ordinary skill in the art to which the present disclosure pertains by referencing the detailed description of the present disclosure given below.

According to an aspect of the inventive concept, there is provided a semantic segmentation method performed by at least one computing device. the method may comprise extracting a plurality of support features, which comprise a first-level feature and a second-level feature, from a support image; generating a plurality of prototypes for a class associated with the support image, based on the plurality of support features; and predicting a segmentation mask for a query image using the plurality of prototypes, wherein the plurality of prototypes comprise a first prototype generated based on the first-level feature and a second prototype generated based on the second-level feature.

In some embodiments, the plurality of support features may be extracted from layers of different depths of a convolutional neural network (CNN)-based feature extractor.

In some embodiments, the generating of the plurality of prototypes may comprise generating the first prototype based on the first-level feature and a correct segmentation mask for the support image.

In some embodiments, the generating of the first prototype may comprise extracting an activation map of a specific class associated with the support image from the first-level feature and generating the first prototype for the specific class by aggregating the activation map and the correct segmentation mask.

In some embodiments, the extracting of the activation map may comprise extracting a first activation map from the first-level feature, aggregating the first-level feature and the first activation map and extracting a second activation map from a result of the aggregating, wherein the first prototype comprises a prototype generated based on the first activation map and a prototype generated based on the second activation map.

In some embodiments, the extracting of the activation map may comprise extracting the activation map by performing a 1×1 convolution operation on the first-level feature.

In some embodiments, the generating of the first prototype may comprise extracting an activation map of a specific class associated with the support image from the first-level feature and generating the first prototype for the specific class by aggregating the first-level feature, the activation map, and the correct segmentation mask.

In some embodiments, the first prototype and the second prototype may be prototypes of a foreground class associated with the support image, and the generating of the plurality of prototypes may comprise generating a background segmentation mask from a correct segmentation mask for the support image and generating a plurality of prototypes for a background class by aggregating each of the first-level feature and the second-level feature and the background segmentation mask.

In some embodiments, the predicting of the segmentation mask may comprise extracting a plurality of query features from the query image, generating a plurality of distance maps for the associated class by calculating distances between the plurality of query features and the plurality of prototypes and predicting the segmentation mask based on the plurality of distance maps, wherein the plurality of distance maps comprise a first distance map generated based on the first prototype and a second distance map generated based on the second prototype.

In some embodiments, the predicting of the segmentation mask based on the distance maps may comprise generating an integrated distance map for the associated class by aggregating the distance maps for each class and predicting the segmentation mask based on the integrated distance map.

In some embodiments, the first distance map and the second distance map may be for a specific class associated with the support image, and the generating of the integrated distance map may comprise matching sizes of the first distance map and the second distance map and concatenating the first distance map and the second distance map in a channel direction and generating an integrated distance map for the specific class based on the concatenated distance maps.

In some embodiments, the first distance map and the second distance map may be for a specific class associated with the support image, and the generating of the integrated distance map may comprise calculating a first weight from the first-level feature, calculating a second weight from the second-level feature and generating an integrated distance map for the specific class by aggregating the first distance map in which the first weight is reflected and the second distance map in which the second weight is reflected.

In some embodiments, the first weight may be calculated by performing an operation on the first-level feature based on a first trainable parameter, the second weight may be calculated by performing an operation on the second-level feature based on a second trainable parameter, and the first trainable parameter and the second trainable parameter may be trained based on a prediction error for the query image.

In some embodiments, the plurality of prototypes may be generated through a prototype generator, the segmentation mask may be predicted through a predictor, and at least one of the prototype generator and the predictor may be trained based on the prediction error for the query image.

In some embodiments, the support image and the query image may be labeled images of a source domain in which correct segmentation masks exist, and the method may further include predicting a segmentation mask for a query image of a target domain by using the trained prototype generator, the trained predictor, and a support image of the target domain.

In some embodiments, at least some of classes belonging to the target domain do not exist in the source domain.

In some embodiments, the number of labeled images belonging to the target domain may be less than the number of labeled images belonging to the source domain.

In some embodiments, the plurality of prototypes may be generated based on the plurality of support features and a correct segmentation mask for the support image through a prototype generator, the predicting of the segmentation mask may be performed through a predictor, and the method may further comprise generating a plurality of prototypes for the query image from a plurality of query features extracted from the query image and the predicted segmentation mask through the prototype generator, predicting a segmentation mask for the support image based on the plurality of prototypes for the query image through the predictor and training at least one of the prototype generator and the predictor based on a prediction error for the support image.

According to another aspect of the inventive concept, there is provided a semantic segmentation system. The system may comprise one or more processors and a memory configured to store one or more instructions, wherein the one or more processors are configured to execute the stored one or more instructions to perform: extracting a plurality of support features, which comprise a first-level feature and a second-level feature, from a support image; generating a plurality of prototypes for a class associated with the support image, based on the plurality of support features; and predicting a segmentation mask for a query image using the plurality of prototypes, wherein the plurality of prototypes comprise a first prototype generated based on the first-level feature and a second prototype generated based on the second-level feature.

According to still another aspect of the inventive concept, there is provided a non-transitory computer-readable recording medium storing computer program, which, when executable by at least one processor, causes the at least one processor to execute: extracting a plurality of support features, which comprise a first-level feature and a second-level feature, from a support image; generating a plurality of prototypes for a class associated with the support image, based on the plurality of support features; and predicting a segmentation mask for a query image using the plurality of prototypes, wherein the plurality of prototypes comprise a first prototype generated based on the first-level feature and a second prototype generated based on the second-level feature.

According to embodiments of the present disclosure, a support set and a query set for training a semantic segmentation model (hereinafter, referred to as a 'segmentation model') may be configured by sampling a plurality of labeled images belonging to a source domain. In addition, the segmentation model may be trained to predict a segmentation mask for a query image based on a distance between a prototype for each class generated based on a support image and a feature extracted from the query image. In this case, since the segmentation model learns to predict the segmentation mask for the query image by referring to the support image, a certain level of segmentation accuracy may be guaranteed through the trained segmentation model even in a target domain in which a small labeled image set exists.

In addition, multi-level features (i.e., a plurality of features having different abstraction levels) may be extracted from the support image, and prototypes for each class (e.g., each foreground object) may be generated based on the extracted multi-level features. Accordingly, a plurality of prototypes containing semantic information of different abstraction levels may be generated for each class, and the segmentation accuracy may be further improved by performing segmentation on the query image using the generated prototypes. For example, a low-level feature has a relatively small receptive field and contains semantic information of a relatively low level of abstraction. Therefore, if a prototype in which this feature is reflected is used, the segmentation accuracy for a narrow object region may be greatly improved.

In addition, a prototype of a specific class may be generated by aggregating a correct segmentation mask for the support image and an activation map of a specific object class. Accordingly, a prototype having a detailed and refined feature may be generated, and the segmentation accuracy may be further improved by using this prototype. For example, the segmentation accuracy for a narrow object region may be further improved.

In addition, a plurality of activation maps for a specific object class may be extracted in a recursive manner. The activation maps extracted in this way may focus on different parts of a corresponding object or may focus more on an important part of the object, so that prototypes having rich and important features may be generated. Accordingly, the semantic segmentation accuracy may be further improved.

In addition, a prototype for each class may be generated based on the query image using the predicted segmentation mask for the query image, and a segmentation mask for the support image may be predicted using the generated prototype. Accordingly, the segmentation model may be trained using not only a prediction error for the query image but also a prediction error for the support image. As a result, the performance of the segmentation model may be further improved.

However, the effects of the present disclosure are not restricted to the one set forth herein. The above and other effects of the present disclosure will become more apparent to one of daily skill in the art to which the present disclosure pertains by referencing the claims.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
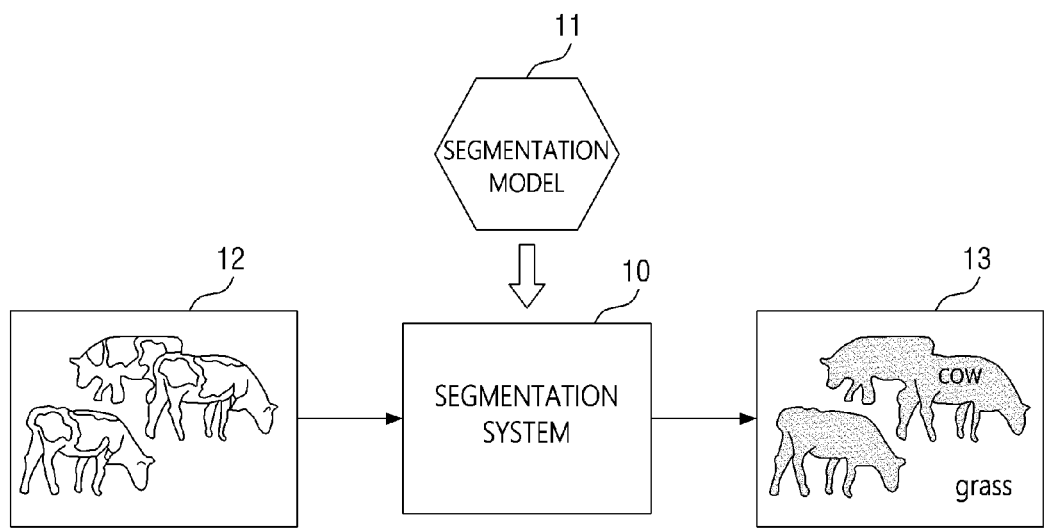
FIG. 1 is an example diagram illustrating a semantic segmentation system and input/output thereof according to embodiments of the present disclosure.

Hereinafter, preferred embodiments of the present disclosure will be described with reference to the attached drawings. Advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that may be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), may be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

Hereinafter, embodiments of the present disclosure will be described with reference to the attached drawings:

FIG. 1 is an example diagram schematically illustrating a semantic segmentation system 10 and input/output thereof according to embodiments of the present disclosure. In FIG. 1, the semantic segmentation system 10 is illustrated as 'segmentation system 10'. In the following description, the semantic segmentation system 10 will be shortened to 'segmentation system 10' for ease of description.

As illustrated in FIG. 1, the segmentation system 10 may be a system that performs semantic segmentation on an input image 12 and outputs the segmentation result 13. The segmentation result 13 may be, for example, a segmentation mask including a classification result (i.e., predicted class information) for each pixel (or pixel group).

For reference, the term 'semantic segmentation' may be used interchangeably with terms such as 'pixelwise prediction', 'dense prediction', and 'semantic segmentation' in some cases. In addition, the term 'segmentation mask' may be used interchangeably with terms such as 'segmentation map', 'segmentation mask map', and 'segmentation result' in some cases.

Specifically, the segmentation system 10 may train (build) a semantic segmentation model 11 (hereinafter, shortened to 'segmentation model') using an image set given a label (i.e., a correct segmentation mask) and may perform semantic segmentation on various images using the trained model 11. The segmentation model 11 is a neural network (or deep learning) model that performs a semantic segmentation task. The structure, operating principle and training method of the model 11 will be described in detail later with reference to FIG. 3 and subsequent drawings.

For reference, the term 'label' may be used interchangeably with terms such as 'correct label', 'ground truth (GT)', 'GT label', and 'annotation' in some cases.

Figure 2:
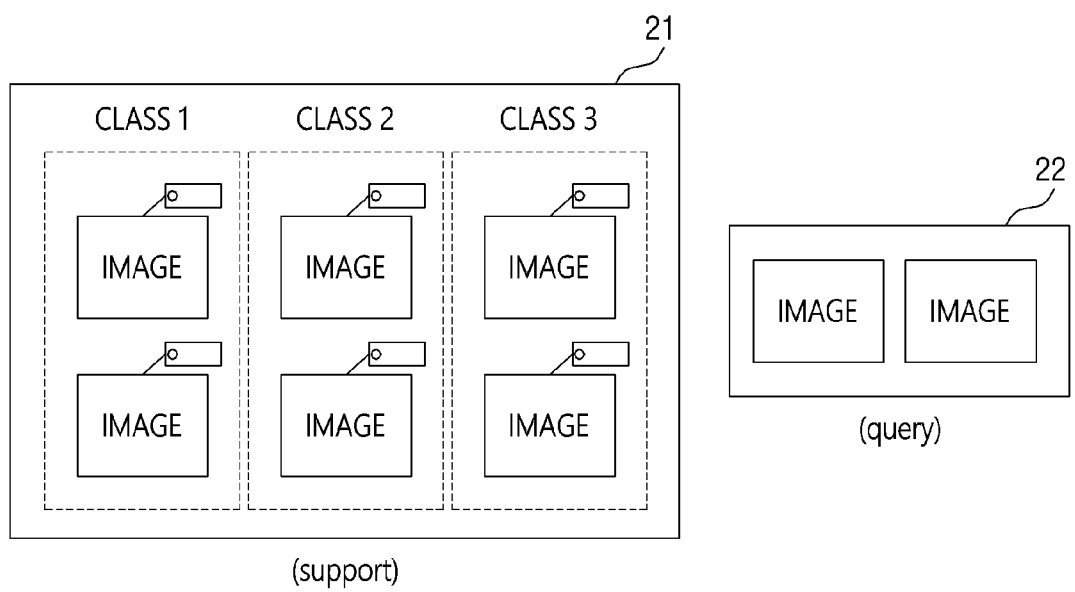
FIG. 2 is an example diagram for explaining characteristics of a target domain in which a semantic segmentation task is performed according to embodiments of the present disclosure.

In some embodiments, a target domain (environment) of the segmentation system 10 may be an environment in which only a very small labeled image set exists. That is, the environment in which the segmentation system 10 performs a task may be a few-shot environment. For example, as illustrated in FIG. 2, a small labeled image set 21 and an unlabeled image set 22 to be segmented may exist in the target domain. In FIG. 2, the labeled image set 21 is composed of images for three classes, and the number of images for each class is two (a so-called '3-way 2-shot' case). The segmentation system 10 may perform semantic segmentation on the unlabeled image set 22 with high accuracy even in the exemplified domain. This will be described later with reference to FIG. 3 and subsequent drawings.

For reference, the labeled image set 21 and the unlabeled image set 22 illustrated in FIG. 2 may also be referred to as a 'support set (or reference set)' and a 'query set', respectively. However, the query set does not mean an image set not given a label but may be understood to mean a set of images to be predicted with the help of the support image set.

The segmentation system 10 may be implemented in at least one computing device. For example, all functions of the segmentation system 10 may be implemented in one computing device, or a first function of the segmentation system 10 may be implemented in a first computing device, and a second function may be implemented in a second computing device. Alternatively, a certain function of the segmentation system 10 may be implemented in a plurality of computing devices.

Figure 25:
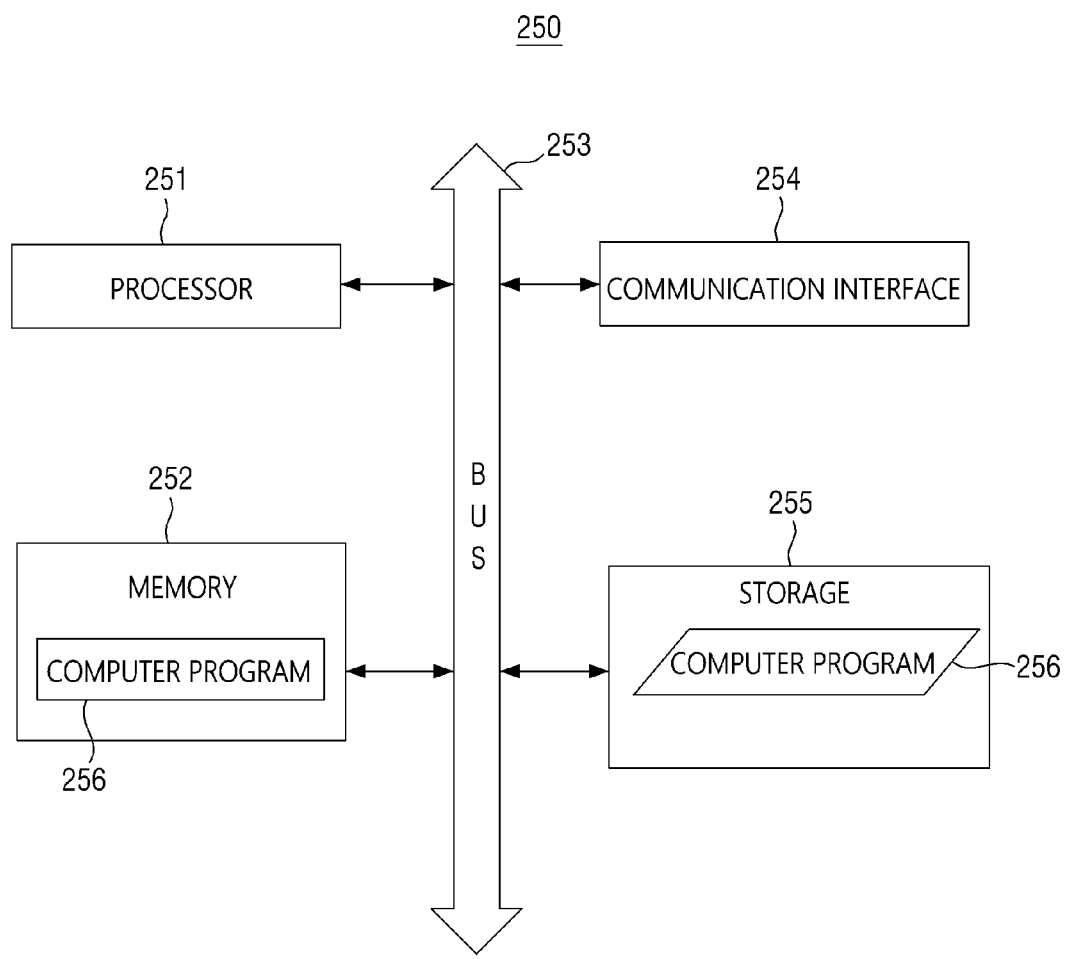
FIG. 25 illustrates an example computing device that may implement the semantic segmentation system according to the embodiments of the present disclosure.

A computing device may be any device having a computing function, and an example of this device is illustrated in FIG. 25. Since the computing device is a collection of various components (e.g., a memory, a processor, etc.) interacting with each other, it may be named a 'computing system' in some cases. In addition, the computing system may also refer to a collection of a plurality of computing devices interacting with each other.

Until now, the segmentation system 10 and the target domain according to the embodiments of the present disclosure have been roughly described with reference to FIGS. 1 and 2. Hereinafter, various methods that may be performed by the above-described segmentation system 10 will be described with reference to FIG. 3 and subsequent drawings.

For ease of understanding, the description will be continued based on the assumption that all steps/operations of the methods to be described later are performed by the above-described segmentation system 10. Therefore, when the subject of a specific step/operation is omitted, it may be understood that the step/operation is performed by the segmentation system 10. However, some steps of the methods to be described later may also be performed by another computing device depending on an implementation method. For example, training a segmentation model (e.g., 11 in FIG. 1) may also be performed by another computing device.

In addition, the description will be continued based on the assumption that the purpose of the methods to be described later is to perform semantic segmentation in a target domain (i.e., a few-shot environment) such as the one illustrated in FIG. 2. However, the scope of the present disclosure is not limited thereto, and the methods to be described later are also applicable without a substantial change in technical spirit even when a large labeled image set exists in the target domain.

Figure 3:
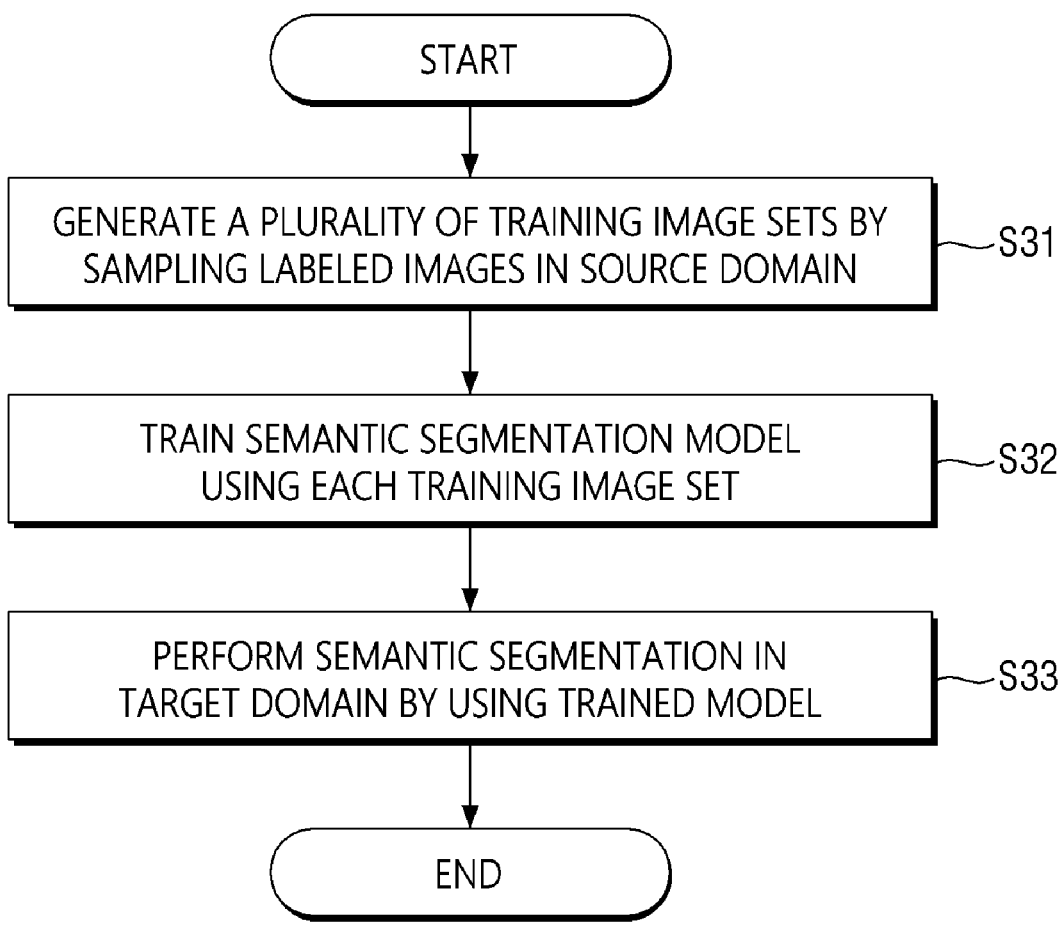
FIG. 3 is an example flowchart illustrating a semantic segmentation method according to embodiments of the present disclosure.

FIG. 3 is an example flowchart illustrating a semantic segmentation method according to embodiments of the present disclosure. However, this is only an exemplary embodiment for achieving the objectives of the present disclosure, and some operations may be added or deleted as needed.

As illustrated in FIG. 3, the method according to the embodiments may start with operation S31 in which a plurality of training image sets are generated by sampling labeled images in a source domain. Here, each of the training image sets may be configured, for example, as illustrated in FIG. 2. That is, the segmentation system 10 may generate a plurality of training image sets having similar forms (characteristics) to a target domain, and each of the training image sets may be composed of two sub-image sets (i.e., a support set and a query set). For better understanding, this will be further described with reference to FIG. 4.

Figure 4:
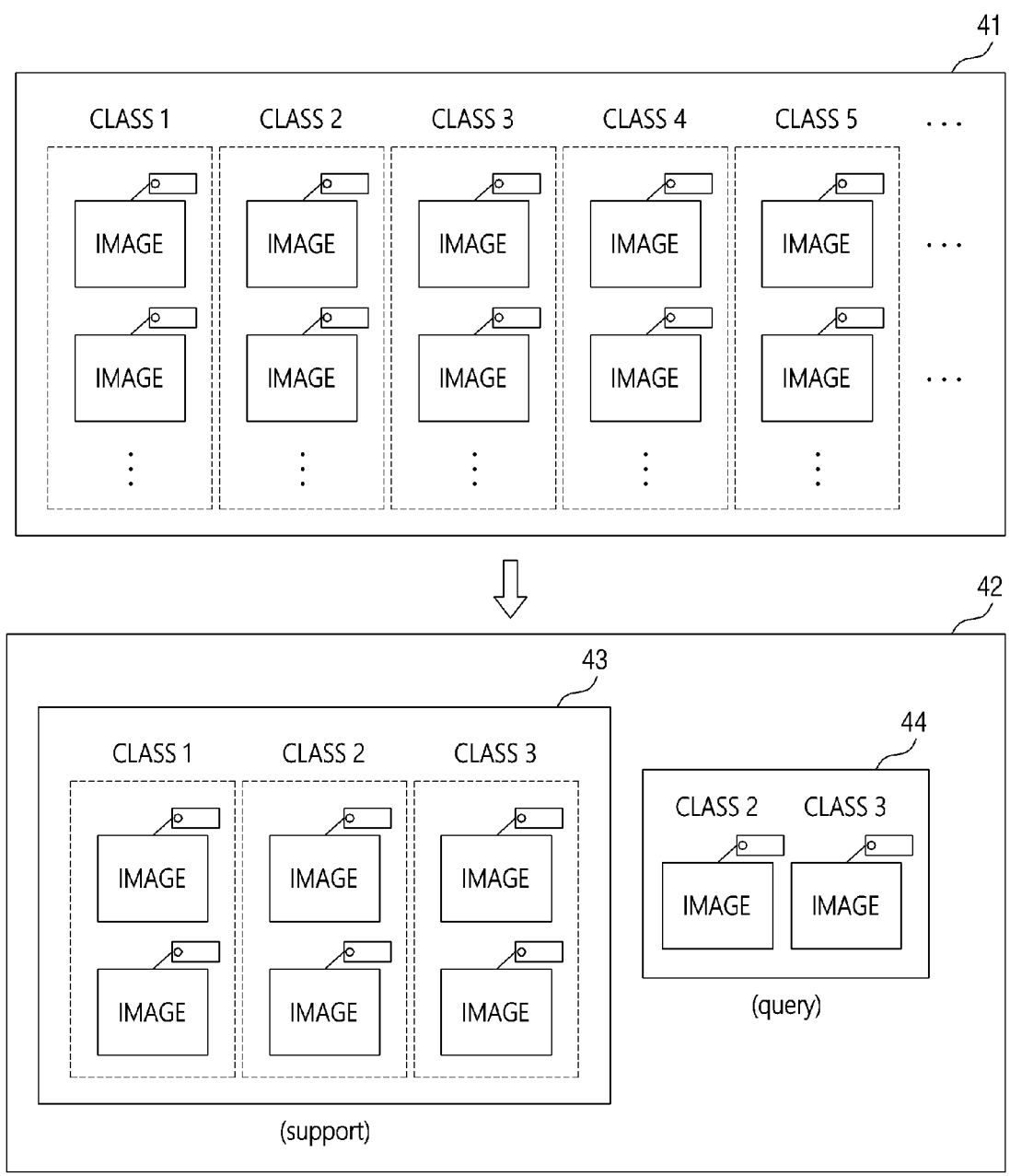
FIG. 4 is an example diagram for further explaining a training image set generating operation in FIG. 3.

As illustrated in FIG. 4, an image set 41 composed of a plurality of labeled images for various classes may exist in the source domain (e.g., the number of labeled images belonging to the source domain may be far greater than the number of labeled images belonging to the target domain). Here, the classes of the source domain (e.g., class 1, class 2, etc.) may be different from those of the target domain (e.g., at least some of the classes existing in the target domain are novel classes that do not exist in the source domain). However, the scope of the present disclosure is not limited thereto, and there may be overlapping classes between the source domain and the target domain.

In the illustrated case, the segmentation system 10 may generate a plurality of training image sets (e.g., 42) by sampling (e.g., random sampling) labeled images from the labeled image set 41 of the source domain. In FIG. 4, a process in which one training image set 42 is generated is illustrated as an example. For example, the segmentation system 10 may form one training image set 42 by generating a support set 43 through sampling of the labeled image set 41 and generating a query set 44 in a similar manner. In addition, the segmentation system 10 may generate a plurality of training image sets by repeating this process.

For reference, the training image set 42 illustrated in FIG. 4 may be referred to as an 'episode' in some cases.

Referring back to FIG. 3, in operation S32, a segmentation model may be trained using each of the training image sets. For example, the segmentation system 10 may repeatedly train the segmentation model using each of the training image sets. In so doing, the segmentation model to be applied to the target domain may be built. It may be understood that the current operation and operation S33 to be described later correspond to a learning (training) operation and an inference (prediction) operation, respectively.

A detailed process of operation S32 and related embodiments will be described in detail below with reference to FIGS. 5 through 19.

Figure 5:
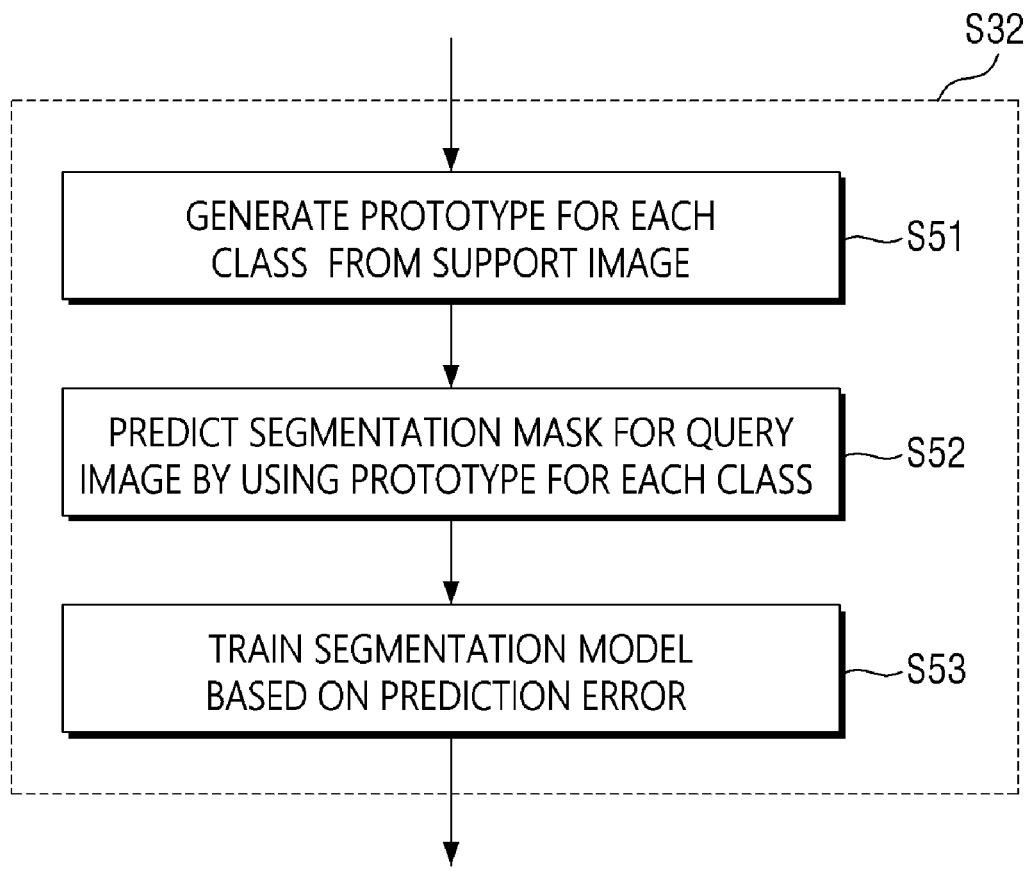
FIG. 5 is an example flowchart illustrating a detailed process of a semantic segmentation model training operation in FIG. 3.

FIG. 5 is an example flowchart illustrating a detailed process of a segmentation model training operation S32 in FIG. 3.

As illustrated in FIG. 5, training a segmentation model may start with operation S51 in which a prototype for each class is generated using support images (i.e., images belonging to a support set).

Here, the prototype refers to a representative feature for a corresponding class and may also be referred as a 'representative feature' or a 'class feature' in some cases. In addition, since a prototype feature may be in the form of a feature vector or a feature map, it may also be referred to as a 'prototype vector', a 'prototype feature vector', a 'prototype map', or a 'prototype feature map' in some cases.

A process of generating a prototype for each class will now be further described with reference to FIGS. 6 and 7.

Figure 6:
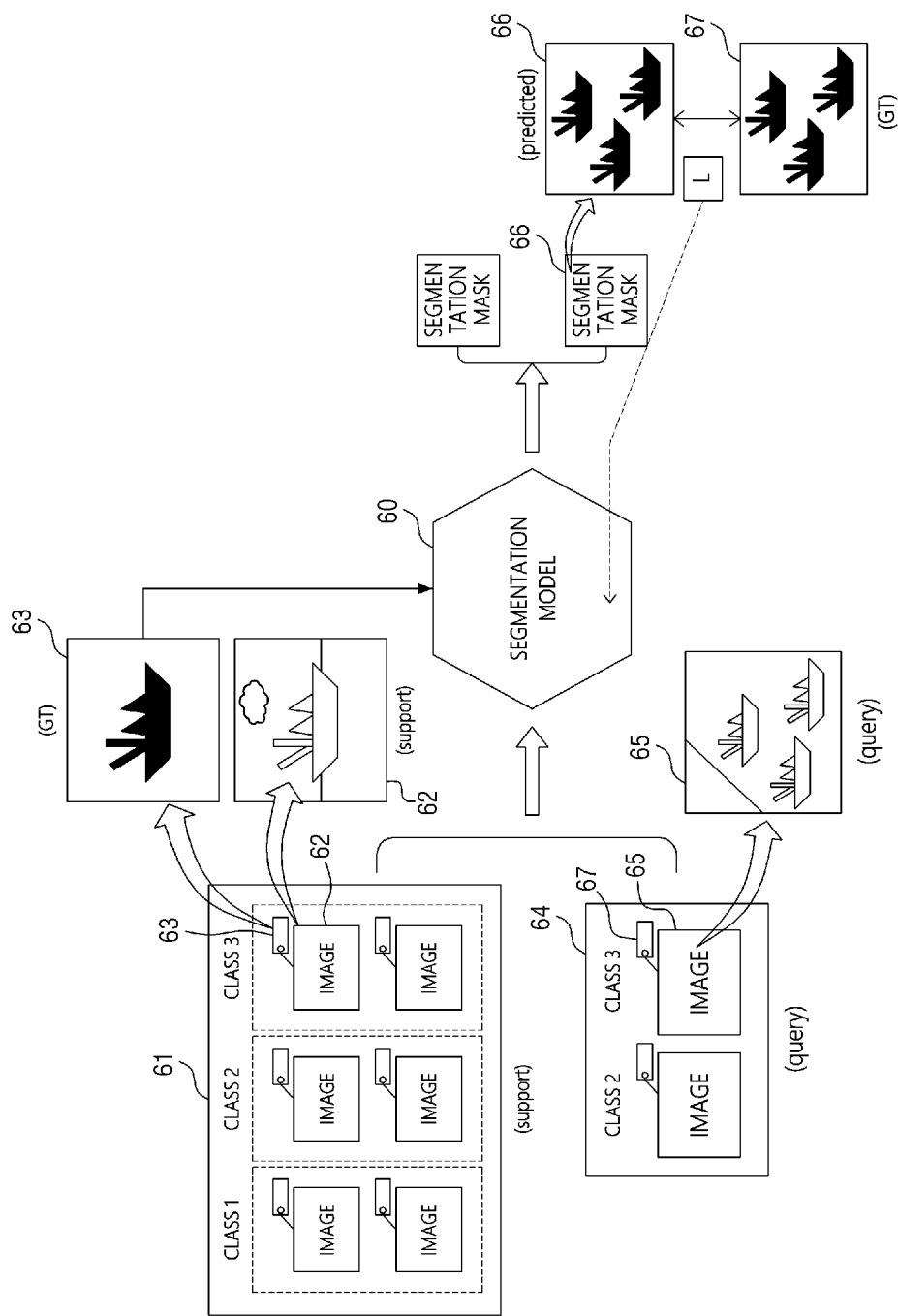
FIGS. 6 and 7 are example diagrams for further explaining the detailed process of the semantic segmentation model training operation in FIG. 5.
Figure 7:
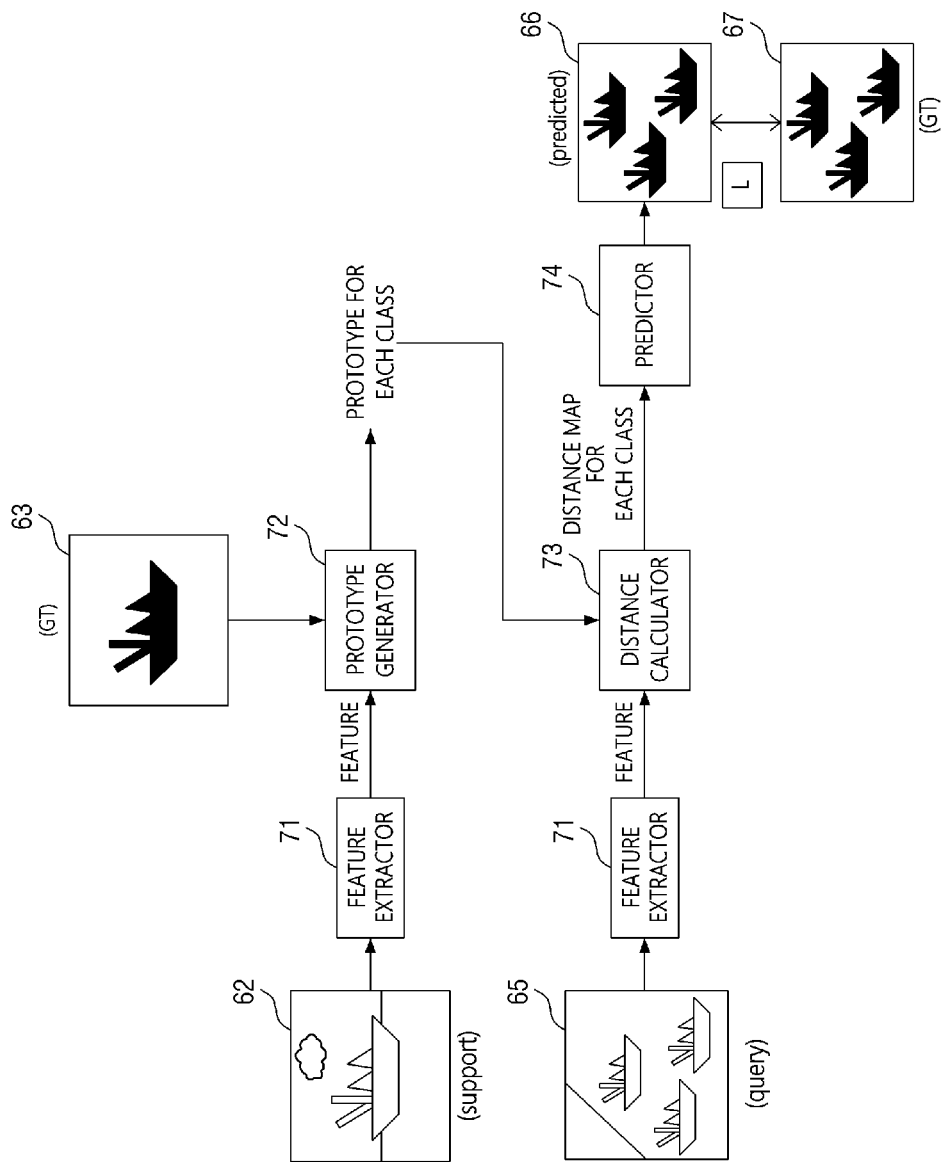

FIG. 6 illustrates a process of training a segmentation model 60, focusing on input and output, and FIG. 7 illustrates the internal operation of the segmentation model 60 in more detail. For reference, a feature extractor 71, a prototype generator 72, a distance calculator 73, and a predictor 74 illustrated in FIG. 7 may be understood as modules that constitute the segmentation model 60, and at least some (71 through 74) of the modules may be trainable modules (i.e., modules having trainable parameters such as weight parameters of a convolution filter). In addition, some other modules (e.g., the distance calculator 73) may be modules that perform predefined operations without trainable parameters.

First, a feature (hereinafter, referred to as a 'support feature') may be extracted from a support image 62 belonging to a support set 61 through the feature extractor 71. Here, the support image 62 may be, for example, an image including only an object of one class (e.g., a 'ship' in the case of FIGS. 6 and 7), but the scope of the present disclosure is not limited thereto. In addition, the feature extractor 71 may be implemented as, for example, a convolutional neural network (CNN)-based neural network and may be pretrained, but the scope of the present disclosure is not limited thereto. The feature extractor 71 may or may not be trained (updated) together with other modules of the segmentation model 60. For example, the segmentation system 10 may train only other modules (e.g., the prototype generator 72 and the predictor 74) of the segmentation model 60 while the feature extractor 71 is frozen.

Figure 8:
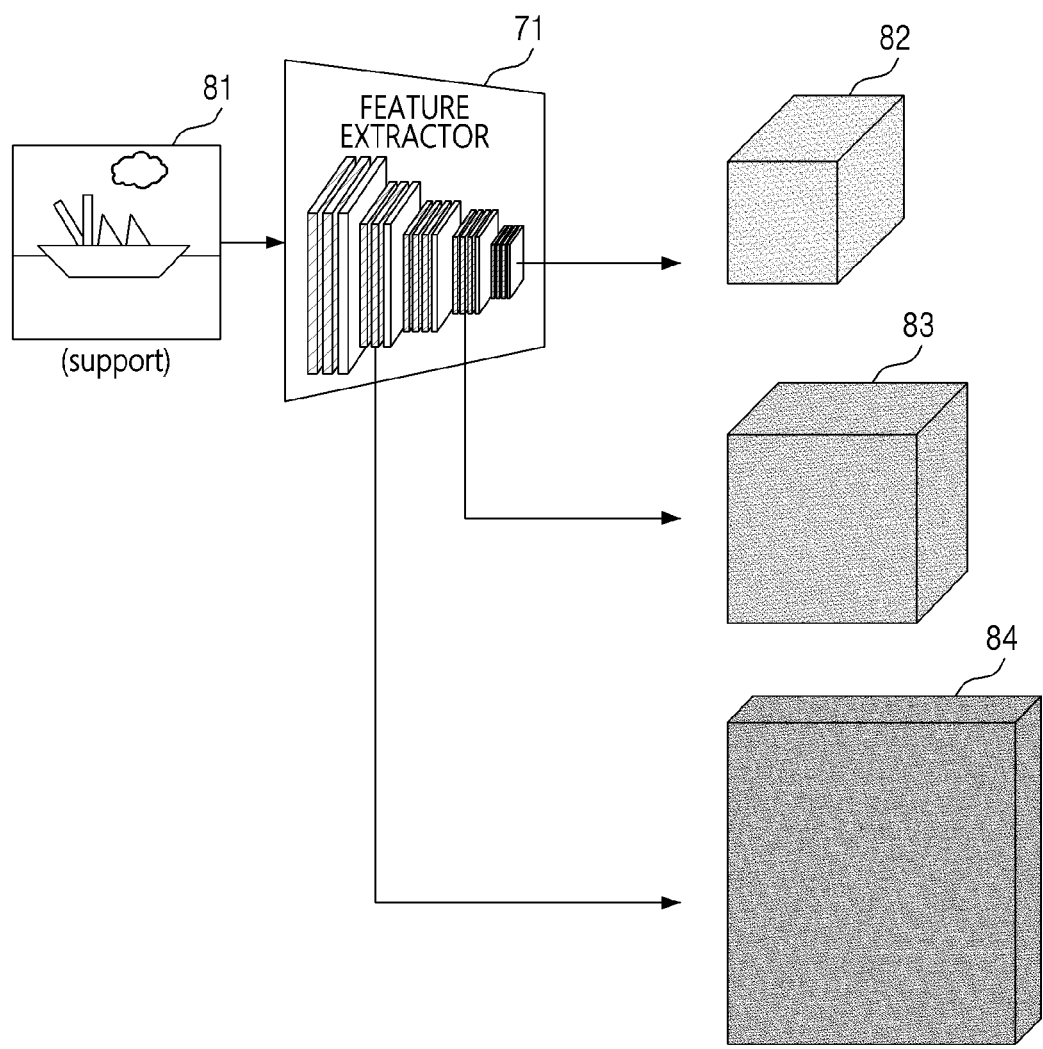
FIG. 8 is an example diagram for explaining a method of extracting multi-level features according to embodiments of the present disclosure.

In some embodiments, as illustrated in FIG. 8, a plurality of support features 82 through 84 (i.e., multi-level features or multi-scale features) having different levels (i.e., abstraction levels) may be extracted from a support image 81 through the CNN-based feature extractor 71. For example, the segmentation system 10 may extract a first-level feature (e.g., a low-level feature) from a first layer (e.g., a convolutional layer) of the feature extractor 71, extract a second-level feature (e.g., a mid-level feature) from a second layer deeper than the first layer, and extract a third-level feature (e.g., a high-level feature) from a third layer deeper than the second layer. According to the current embodiments, segmentation may be performed by further using a low-level feature having a relatively small receptive field and including many low-level semantic information. Therefore, segmentation may be performed with high accuracy even for a relatively narrow object region. In addition, since features of various levels are used together, the overall segmentation accuracy may be improved. FIG. 8 illustrates a case where features of three levels are extracted through the feature extractor 71 as an example, but the scope of the present disclosure is not limited thereto. For better understanding, however, the description will be continued based on the assumption that support features of three levels are extracted.

Next, a prototype for each class may be generated through the prototype generator 72. Specifically, the prototype generator 72 may generate a prototype for each class by using a support feature and a correct segmentation mask 63 of the support image 62. For example, the prototype generator 72 may generate a prototype of a first class by using a feature (i.e., a support feature) extracted from a support image of the first class and a correct segmentation map of the support image. In addition, the prototype generator 72 may generate a prototype of a second class by using a feature extracted from a support image of the second class and a correct segmentation mask of the support image.

More specifically, the prototype generator 72 may generate the prototype for each class by aggregating a support feature and the correct segmentation mask 63. Alternatively, the prototype generator 72 may generate the prototype for each class by aggregating an activation map extracted from the support feature and the correct segmentation mask 63. Alternatively, the prototype generator 72 may generate the prototype for each class by aggregating the support feature, the activation map, and the correct segmentation mask 63. Here, the activation map is a feature map in which a feature of a corresponding class is more activated. In some cases, the activation map may be referred to as a 'feature map', an 'uncertainty map', an 'activation mask', or an 'uncertainty mask'.

Figure 9:
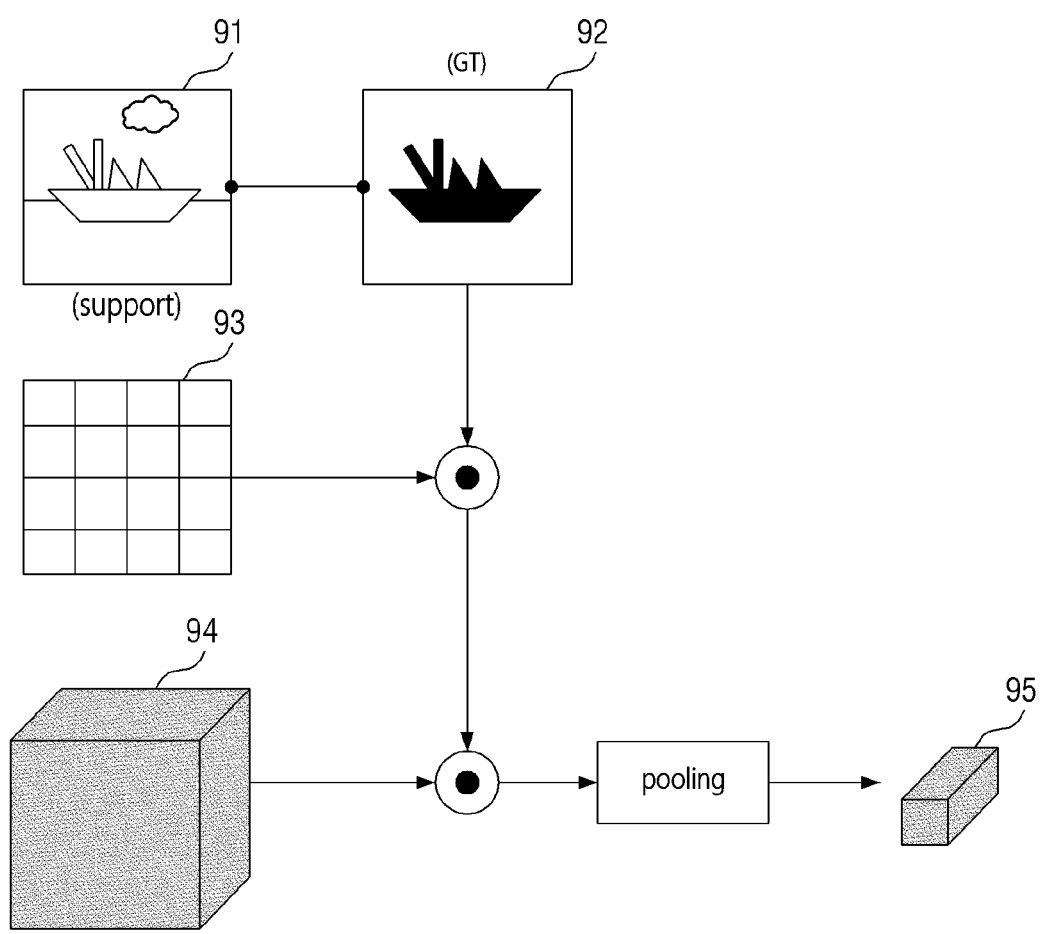
FIG. 9 is an example diagram for explaining a prototype generation method according to embodiments of the present disclosure.

The aggregating method may be, for example, concatenation, stacking, convolution (e.g., 1×1 convolution), pixelwise (elementwise) multiplication/sum, multiplication, addition, averaging, pooling (e.g., maximum pooling, average pooling, weighted average pooling, global average pooling, etc.), or a combination thereof, but the scope of the present disclosure is not limited thereto. For example, as illustrated in FIG. 9, the prototype generator 72 may perform a pixelwise multiplication operation (for reference, '⊙' in FIG. 9 and subsequent drawings represents a pixelwise multiplication operation) on a correct segmentation mask 92 for a support image 91 of a specific class and an activation map 93 of the specific class and may perform a pixelwise multiplication operation again on the operation result and a support feature 94 (e.g., a support feature of a specific level). Then, the prototype generator 72 may generate a prototype 95 of the specific class by performing a pooling operation on the operation result (e.g., performing an average pooling operation on a feature map of each channel). In addition, the prototype generator 72 may generate prototypes (not illustrated) of other classes in a similar manner.

For reference, if a specific class has K support images (where K is a natural number equal to or greater than 2), a final prototype of the class may be generated by appropriately aggregating (e.g., averaging) K prototypes.

A specific method of extracting an activation map of each class may vary according to embodiments.

Figure 10:
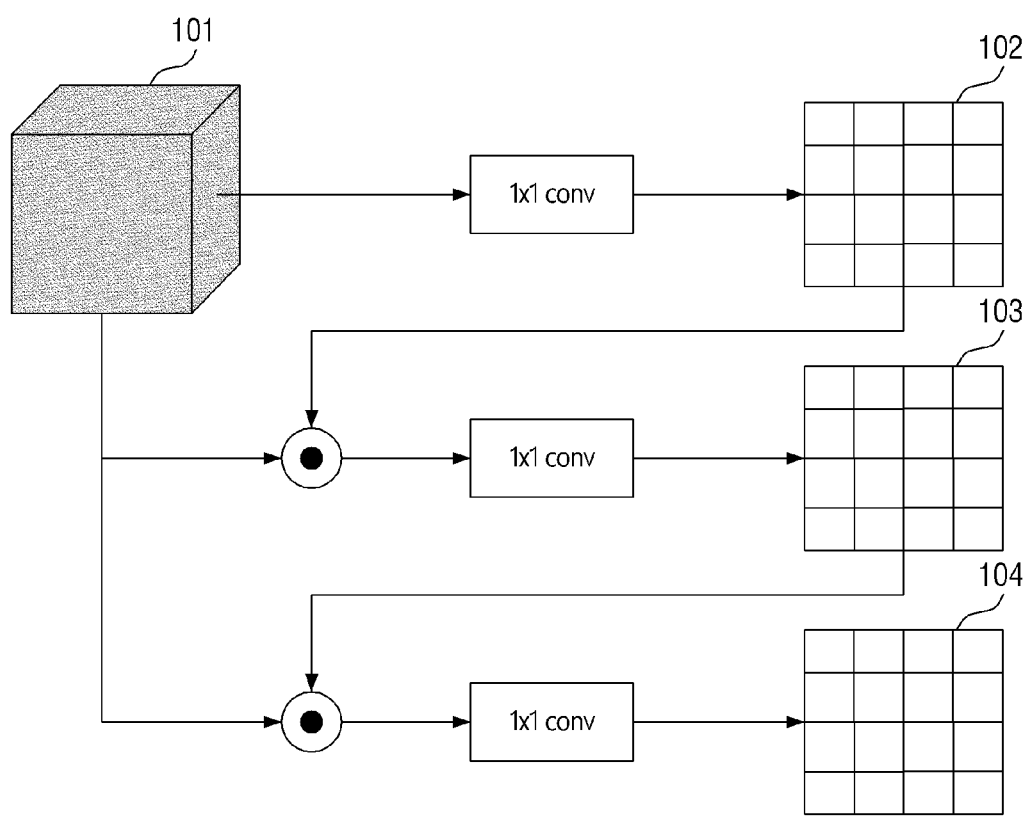
FIG. 10 is an example diagram for explaining an activation map extraction method according to embodiments of the present disclosure.

In some embodiments, a plurality of activation maps may be extracted in a recursive manner. For example, as illustrated in FIG. 10, the prototype generator 72 may extract a first activation map 102 by performing a convolution operation (e.g., 1×1 convolution) on a support feature 101 (e.g., a support feature of a specific level). In addition, the prototype generator 72 may extract a second activation map 103 by aggregating the first activation map 102 and the support feature 101 and performing a convolution operation again. In a similar manner, the prototype generator 72 may also extract a third activation map 104 based on the second activation map 103. The activation maps 102 through 104 extracted in this way may focus on different parts of a corresponding object (i.e., a specific object class) or may focus more on an important part of the object, so that prototypes having rich and important features may be generated. Accordingly, the performance of the segmentation model 60 may be further improved.

For reference, FIG. 10 illustrates a case where the type of the convolution operation is '1×1 convolution' and the aggregating method is 'pixelwise multiplication' as an example. However, the type of the convolution operation, the aggregating method, the number of operations, etc. may vary. In addition, the number of activation maps extracted may vary.

In addition, in FIG. 10 or other drawings, filters used for convolution operations may or may not share weight parameters. That is, the prototype generator 72 may extract a plurality of activation maps (e.g., 102 through 104) through one convolution filter or may extract one activation map through one convolution filter.

In addition, in some cases, the prototype generator 72 may further perform an operation of normalizing (or adjusting within a specific range) the value of an activation map (e.g., 102) by using a negative exponential, softmax, or predetermined normalization function.

Figure 11:
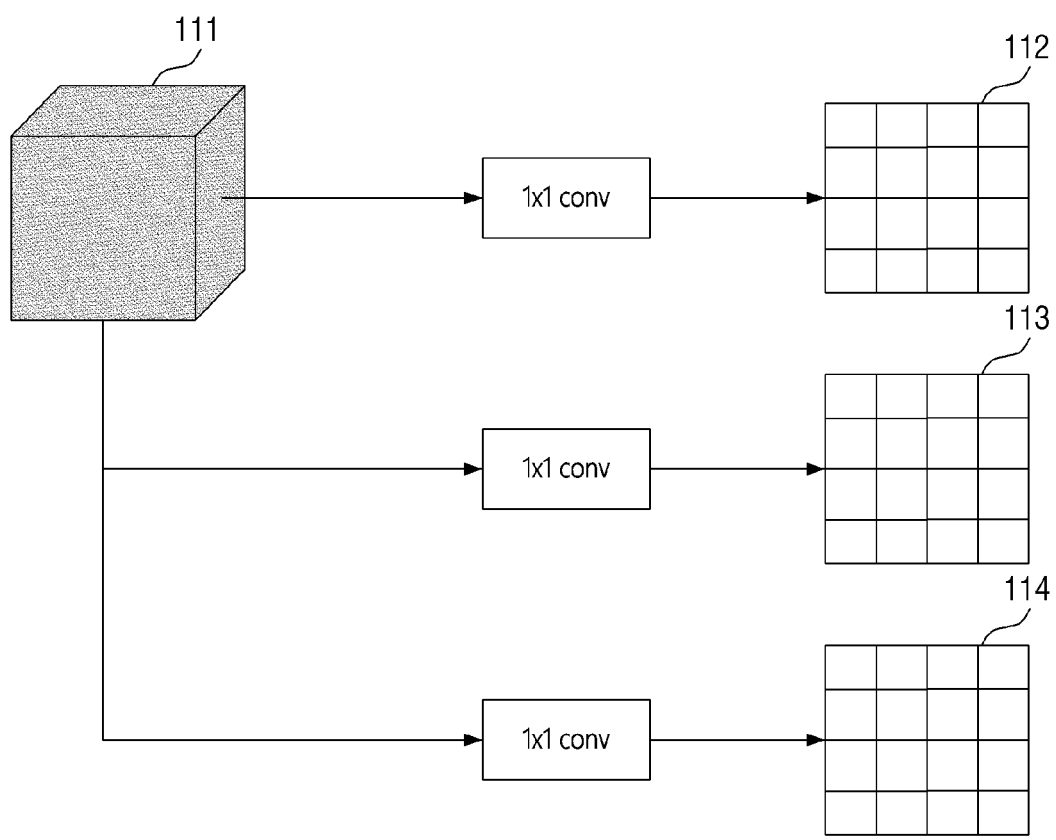
FIG. 11 is an example diagram for explaining an activation map extraction method according to embodiments of the present disclosure.

In some embodiments, a plurality of activation maps may be extracted in a non-recursive (independent) manner. For example, as illustrated in FIG. 11, the prototype generator 72 may extract a plurality of activation maps 112 through 114 by independently performing convolution operations (e.g., 1×1 convolution) on a support feature 111 (e.g., a support feature of a specific level). Here, each convolution operation may be performed using a convolution filter that does not share a weight parameter.

In some embodiments, activation maps may be extracted based on various combinations of the above embodiments.

When a plurality of activation maps (e.g., 102 through 104) are extracted from a support feature (e.g., a support feature of a specific level), prototype may be extracted for each activation map. This will be further descried with reference to FIGS. 12 and 13.

Figure 12:
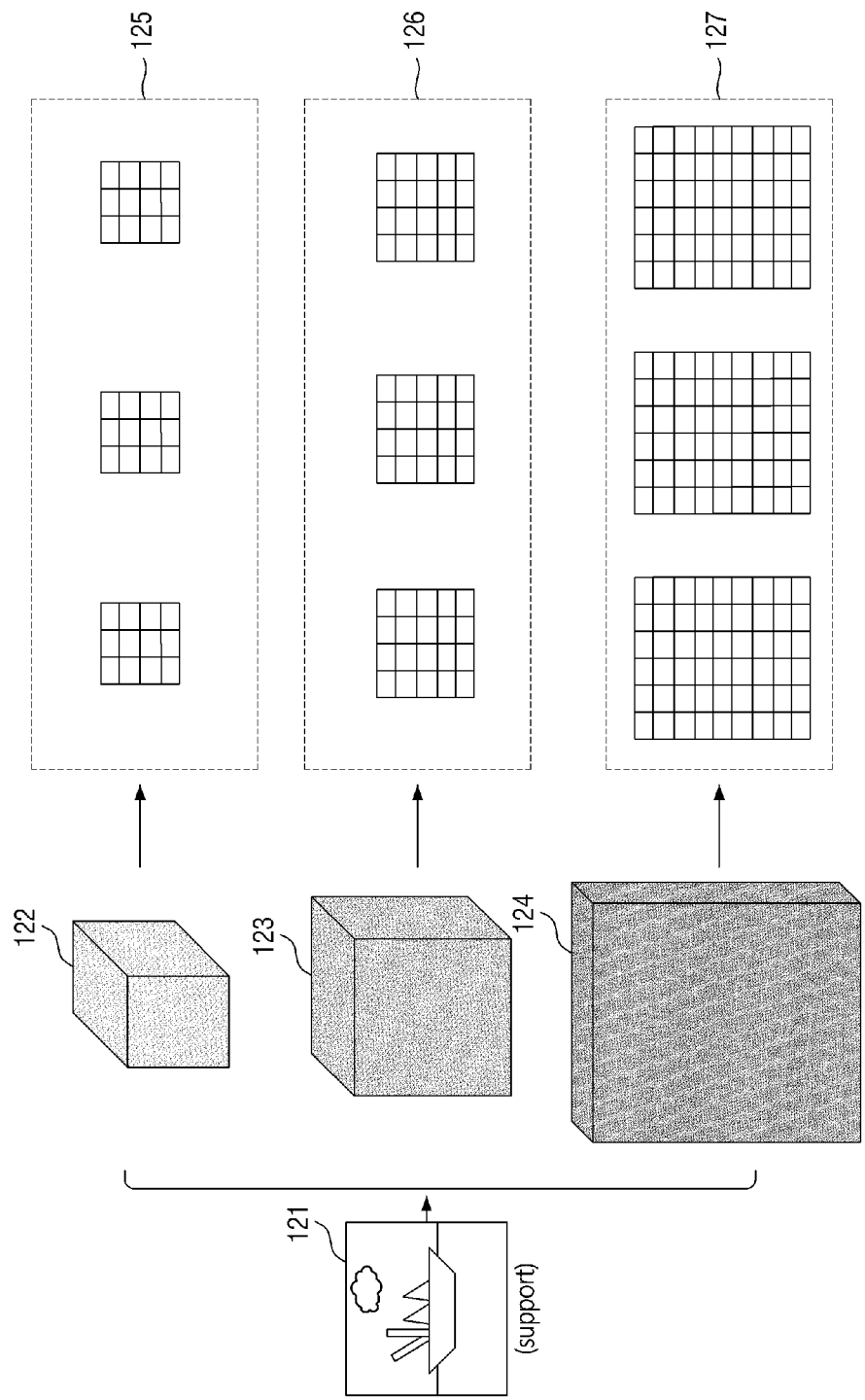
FIGS. 12 and 13 are example diagrams for explaining the number of multi-level features, activation maps and prototypes that may be extracted/generated according to embodiments of the present disclosure.
Figure 13:
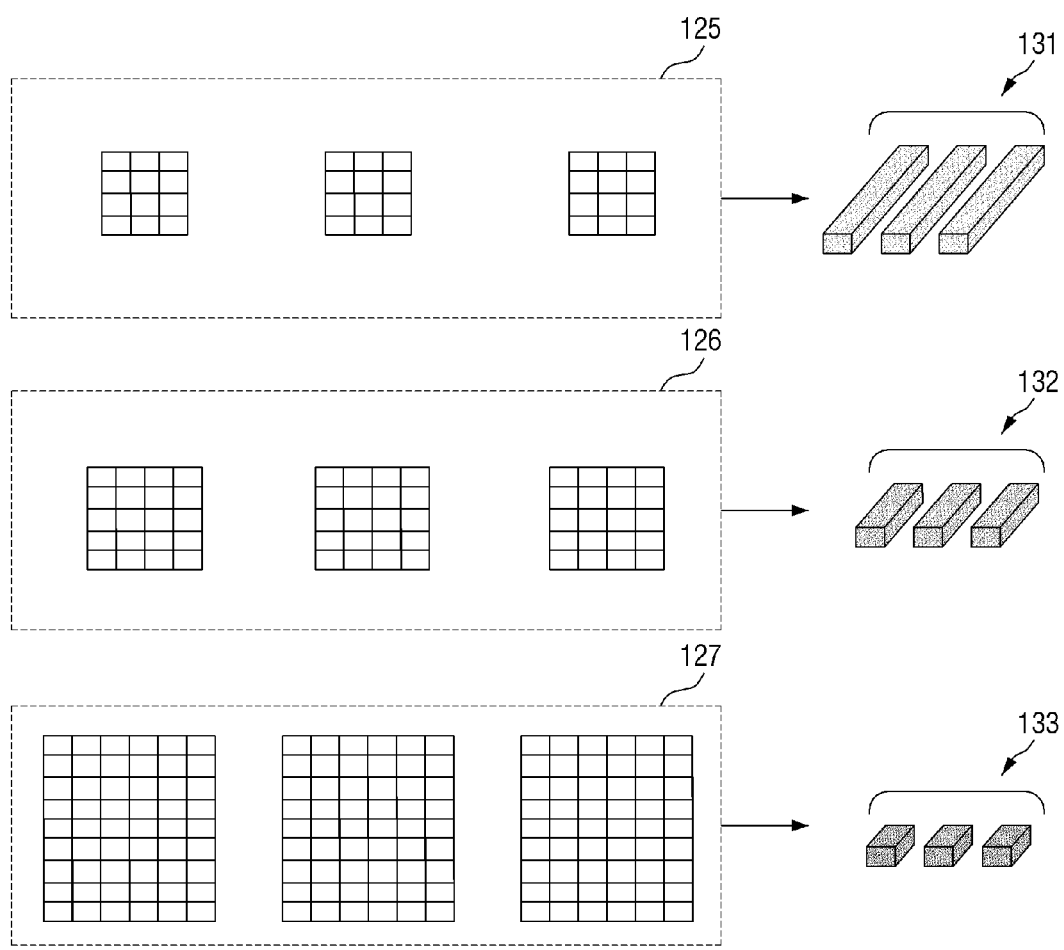

FIGS. 12 and 13 illustrate prototypes of a specific class extracted from multi-level features and a plurality of activation maps.

As illustrated in FIG. 12, it is assumed that support features 122 through 124 of three levels were extracted from a support image 121 of a specific class and that three activation maps 125 through 127 were extracted from the features 122 through 124, respectively. In this case, as illustrated in FIG. 13, a total of 'nine' prototypes 131 through 133 may be generated for the specific class. This is because prototypes may be generated for each activation map.

To generalize the above description, when the number of feature levels extracted is M (where M is a natural number equal to or greater than 1), the number of activation maps is T (where T is a natural number equal to or greater than 1), and the number of classes is N (where N is a natural number equal to or greater than 1), it may be understood that the total number of prototypes generated is N×M×T (i.e., M×T per class).

Figure 14:
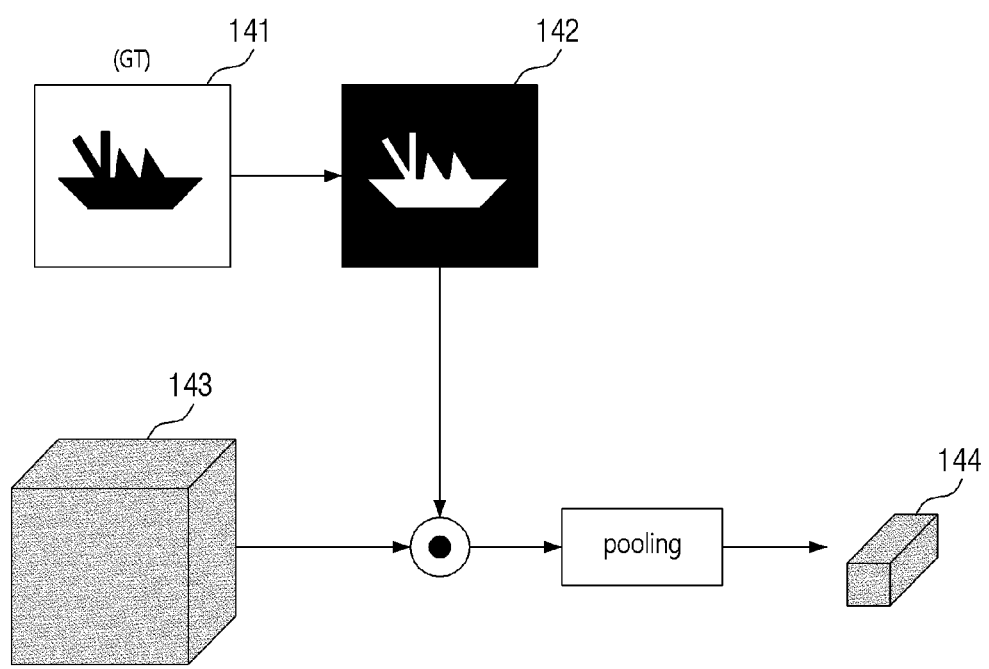
FIG. 14 is an example diagram for explaining a method of generating a prototype of a background class according to embodiments of the present disclosure.

In some embodiments of the present disclosure, a prototype of a background class may be further generated. The prototype of the background class may also be extracted in a similar way to the prototype of a foreground (object) class described above. For example, as illustrated in FIG. 14, the prototype generator 72 may generate a prototype 144 of the background class by generating a background segmentation mask 142 from a correct segmentation mask 141 for a support image of a specific class, aggregating (e.g., performing a pixelwise multiplication on) a support feature 143 and the background segmentation mask 142, and performing a pooling operation (e.g., average pooling) on the aggregation result. If there are a plurality of foreground (object) classes, the prototype generator 72 may generate a plurality of prototypes (e.g., 144) from support images of the foreground (object) classes. Then, the prototype generator 72 may generate a final prototype for the background class by aggregating (e.g., averaging) the generated prototypes. The prototype generator 72 may also generate a plurality of prototypes (e.g., 144) for the background class by performing the above-described operation on support features (e.g., 143) of different levels. That is, the prototype for the background class may also be generated for each feature level.

For reference, since the prototype of the background class is not reflected in the above formula ('N×M×T'), it may be understood that a total of M (N×T+1) prototypes are generated when the prototype of the background class is taken into account.

Until now, operation S51 of generating a prototype for each class from a support image (or a support set) has been described with reference to FIGS. 6 through 13.

Subsequent operations will now be described with reference to FIG. 5 again. The subsequent operations relate to a process of performing prediction (i.e., semantic segmentation) on a query set (i.e., a query set included in a training image set).

In operation S52, a segmentation mask for a query image (i.e., an image belonging to a query set) may be predicted using the prototype for each class. For example, as illustrated in FIG. 7, the segmentation system 10 may extract a feature (hereinafter, referred to as a 'query feature') from a query image through the feature extractor 71 and calculate a distance (i.e., a distance in a feature space) between the query feature (e.g., a multi-level feature) and the prototype for each class through the distance calculator 73. As a result, a distance map for each class may be generated. Then, the segmentation system 10 may predict a segmentation mask 66 from the distance map for each class through the predictor 74.

For better understanding, operation S52 will be further described with reference to FIGS. 15 through 18. However, a method of extracting a query feature from a query image will not be described here and may be understood from the description of FIG. 8, etc.

Figure 15:
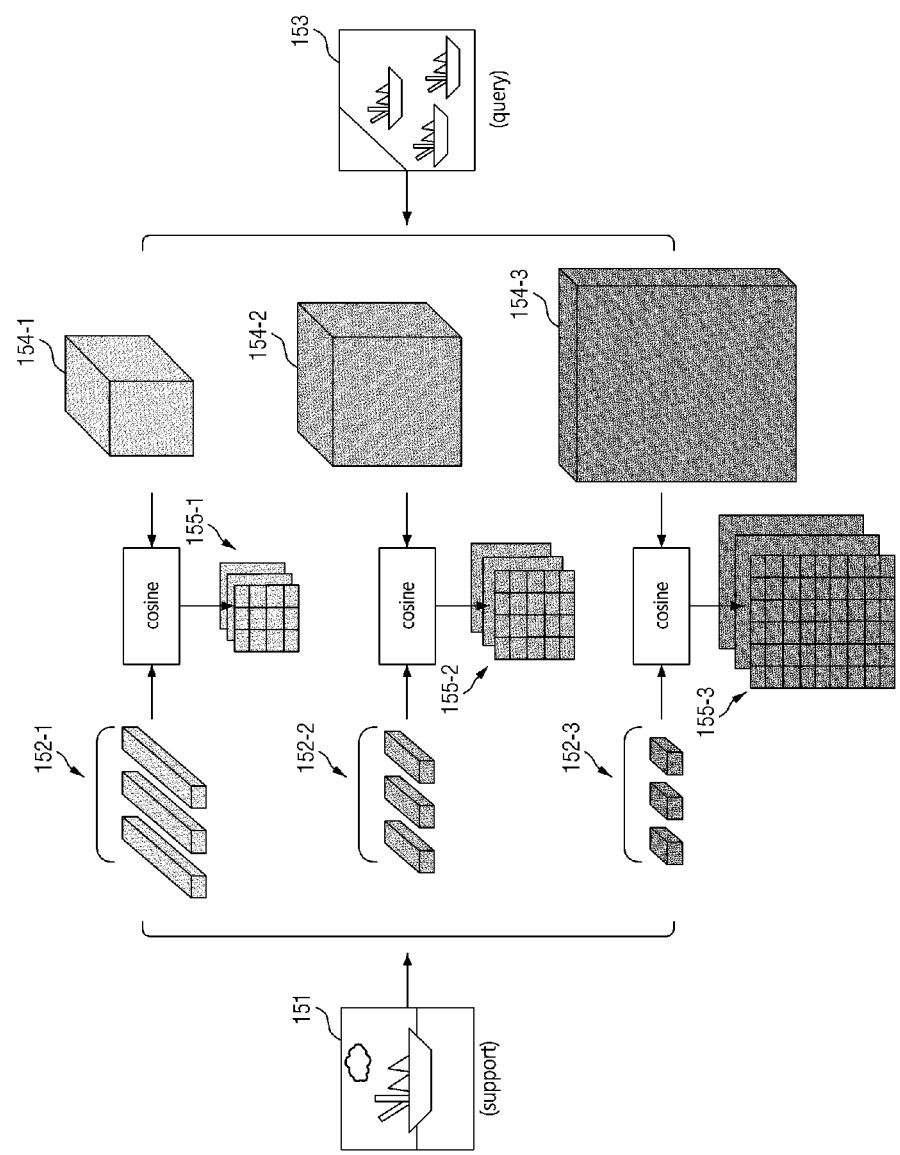
FIG. 15 is an example diagram for explaining a method of generating distance maps according to embodiments of the present disclosure.
Figure 16:
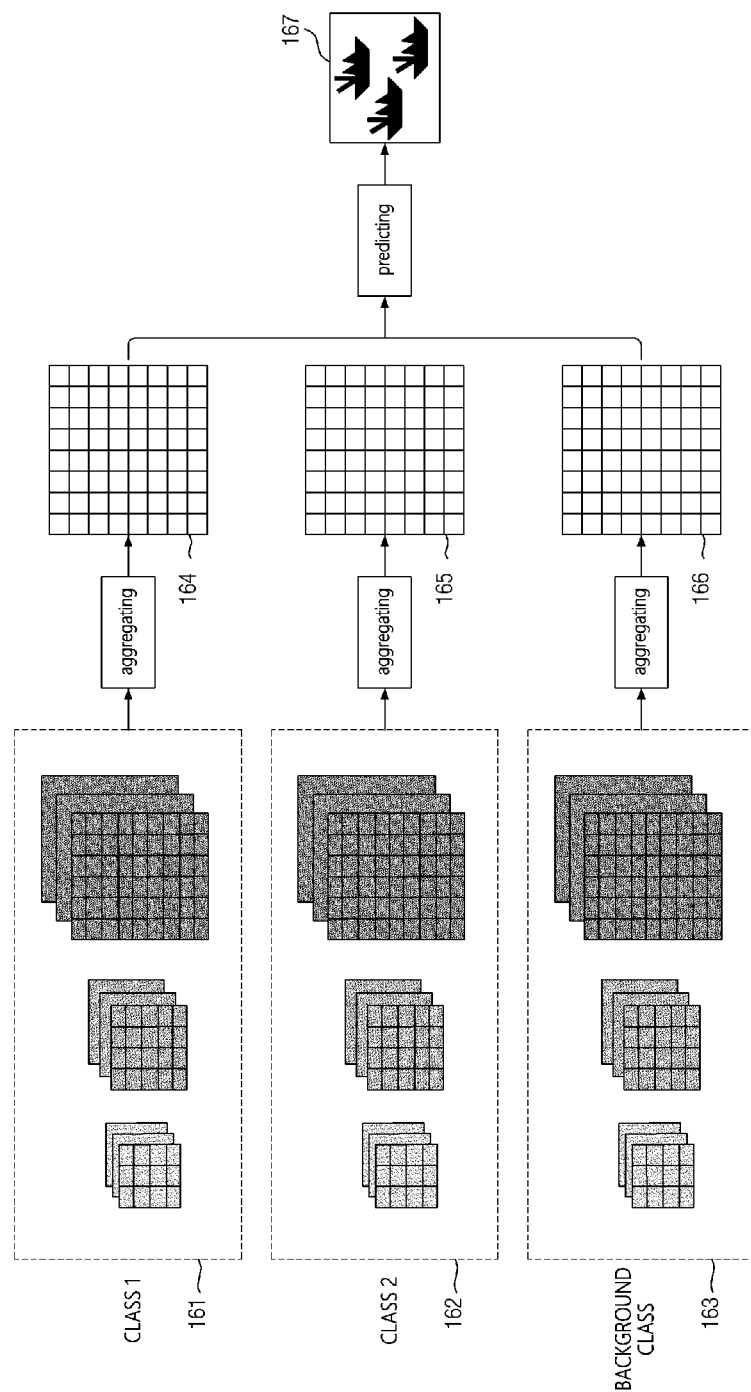
FIG. 16 is an example diagram for explaining a method of predicting a segmentation mask based on integrated distance maps according to embodiments of the present disclosure.

FIGS. 15 and 16 illustrate a process of generating a distance map for each class through the distance calculator 73. In FIG. 15, it is assumed that three prototypes 152-1, 152-2 or 152-3 were generated for each feature level from a support image 151 of a specific class and that features 154-1 through 154-3 of three levels were extracted from a query image 153. In addition, in FIG. 15, it is assumed that the distance calculator 73 calculates a distance between features based on a cosine distance (or similarity). However, the scope of the present disclosure is not limited thereto, and the distance (or similarity) calculation method may vary.

As illustrated in FIG. 15, the distance calculator 73 may generate distance maps 155-1, 155-2 or 155-3 by calculating, for each feature level, distances between the query feature 154-1, 154-2 or 154-3 and the prototypes 152-1, 152-2 or 152-3. The calculation is performed for each feature level because features of different levels will have different semantic information.

Specifically, the distance calculator 73 may generate first distance maps 155-1 by calculating distances between a first-level feature 154-1 of the query image 153 and the prototypes 152-1 of a corresponding level. For example, one distance map may be generated for one prototype. In a more specific example, when the number of the prototypes 152-1 and the number of channels of the first-level feature 154-1 are equal, the distance calculator 73 may calculate distances between the three prototypes 152-1 and channel vectors of the first-level feature 154-1, respectively. As a result, three first distance maps 155-1 may be generated in two dimensions.

In addition, the distance calculator 73 may generate second distance maps 155-2 by calculating distances between a second-level feature 154-2 of the query image 153 and the prototypes 152-2 of a corresponding level. The distance calculator 73 may also generate third distance maps 155-3 in a similar manner.

The distance calculator 73 may generate a plurality of distance maps for each class by performing the above process for prototypes of other classes.

Next, the predictor 74 may generate an integrated distance map for each class by aggregating the distance maps for each class and may predict a segmentation mask for a query image based on the generated integrated distance map. This will now be further described with reference to FIG. 16.

FIG. 16 illustrates a process of predicting a segmentation mask 167 using distance maps 161 through 163 for two foreground (object) classes and a background class. In FIG. 16, it is assumed that prototypes of each foreground class were generated from three activation maps.

As illustrated in FIG. 16, the predictor 74 may generate an integrated distance map 164 for a first class (e.g., 'class 1') by aggregating the distance maps 161 of the first class. The aggregating method may be, for example, concatenation, stacking, convolution (e.g., 1×1 convolution), pixelwise (elementwise) multiplication/sum, multiplication, addition, averaging, pooling (e.g., maximum pooling, average pooling, weighted average pooling, global average pooling, etc.), or a combination thereof, but the scope of the present disclosure is not limited thereto.

Figure 17:
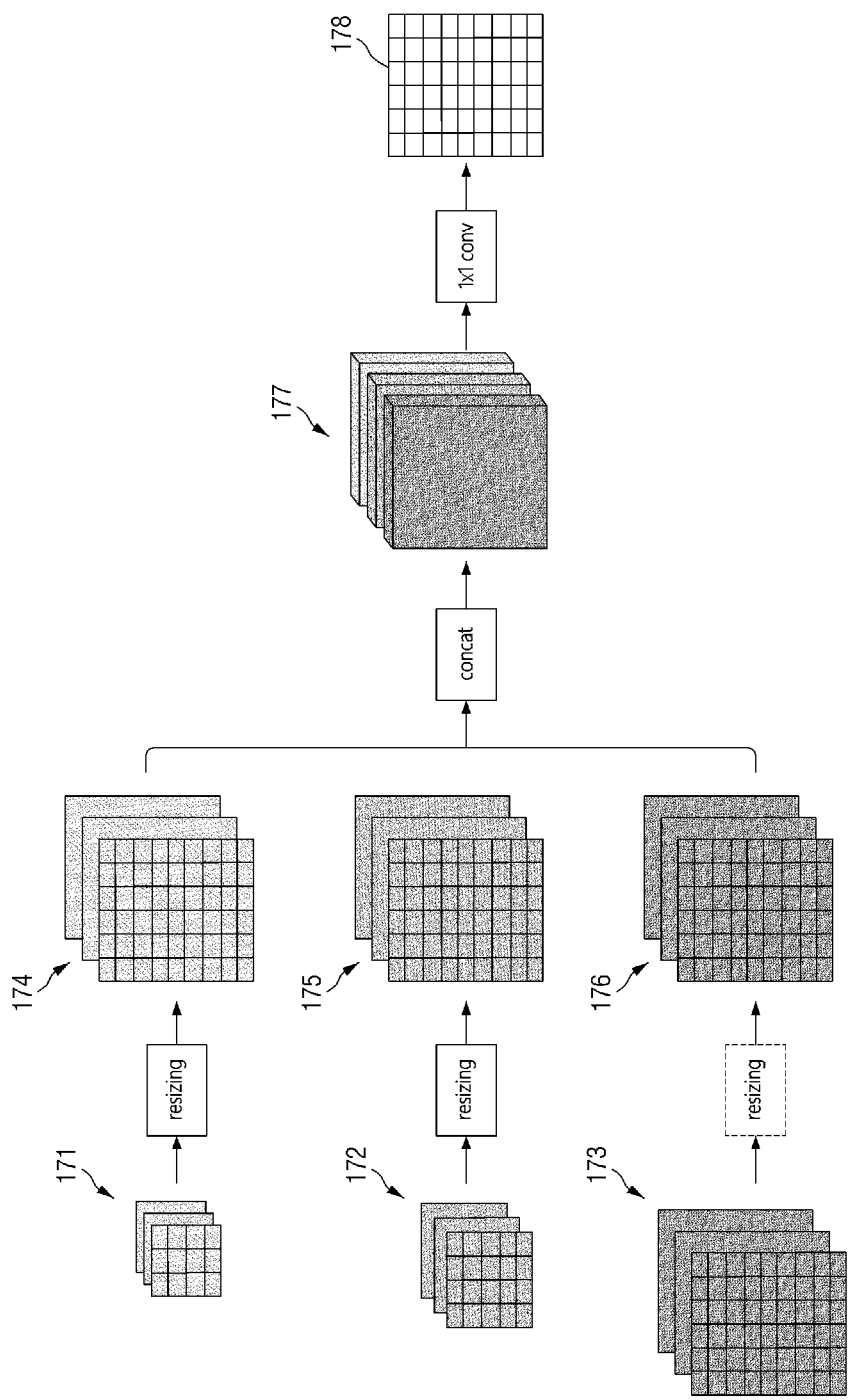
FIG. 17 is an example diagram for explaining a method of generating an integrated distance map according to embodiments of the present disclosure.

For example, as illustrated in FIG. 17, the predictor 74 may generate an integrated distance map 178 for a specific class by matching sizes of distance maps 171 through 173 of the specific class, concatenating the size-matched distance maps 174 through 176 in a channel direction, and then performing operations such as convolution and pooling on the concatenated distance maps 177. In a more specific example, the predictor 74 may match the sizes of the distance maps 171 through 173 with the size of an input query image or a largest distance map (e.g., the distance maps 173). This resizing operation may not be performed on distance maps that do not need to be resized (see the dotted line in FIG. 17). The resizing operation may be performed based on, for example, linear interpolation, but the scope of the present disclosure is not limited thereto.

Referring back to FIG. 16, the predictor 74 may generate an integrated distance map 165 for a second class (e.g., 'class 2') by aggregating the distance maps 162 of the second class and may generate an integrated distance map 166 for the background class in a similar way to the above description.

Next, the predictor 74 may predict the segmentation mask 167 for a query image (e.g., 153) based on the generated integrated distance map 164, 165 or 166 for each class. For example, the predictor 74 may predict the class of each pixel (or pixel group) of the query image as the class of an integrated distance map having a minimum distance value. In other words, assume that the value of the integrated distance map 164 for the first class is the smallest as a result of comparing the values of the integrated distance maps 164 through 166 corresponding to a first pixel of the query image. In this case, the predictor 74 may predict the class of the first pixel of the query image as the first class. This process may be repeated for other pixels of the query image to generate the segmentation mask 167 for the query image.

According to some embodiments of the present disclosure, a weight may be calculated for each feature level of each class. Then, the calculated weight may be reflected in a distance map of a corresponding feature level to generate an integrated distance map. In this case, since distance maps of different levels (i.e., similarities in a feature space) may be differentially considered (i.e., a distance map of a significant level may be more considered in segmentation mask prediction), segmentation accuracy may be further improved.

Figure 18:
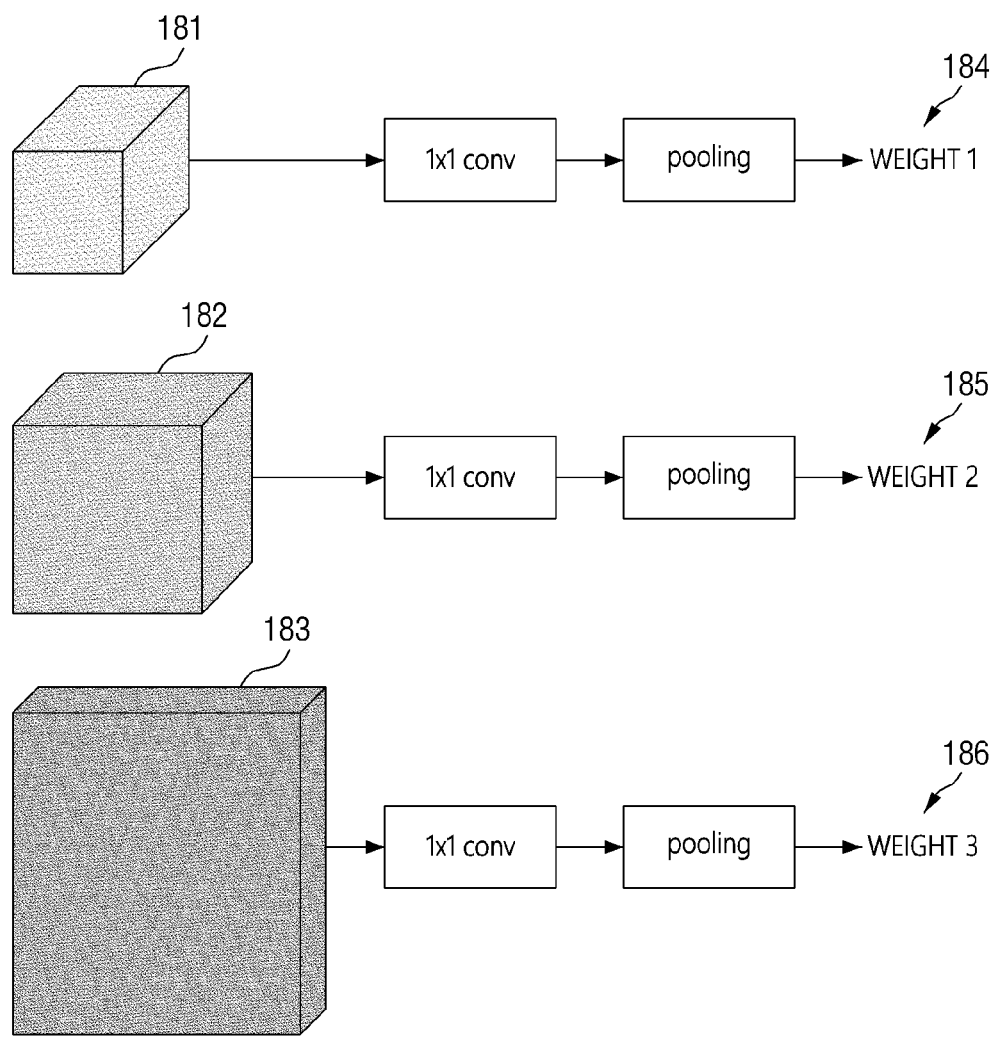
FIG. 18 is an example diagram for explaining a method of generating an integrated distance map by reflecting a weight for each feature level according to embodiments of the present disclosure.

In the above embodiments, the weight for each feature level may be calculated by performing an appropriate operation on a multi-level feature based on trainable parameters. Here, the trainable parameters refer to parameters that are trained together with a segmentation model. Using these parameters, it is possible to accurately and easily determine which level of feature is more important for each class during the process of training the segmentation model. For example, as illustrated in FIG. 18, a weight 184, 185 or 186 for each feature level may be calculated by performing a convolution operation (e.g., 1×1 convolution) and a pooling operation (e.g., global average pooling) on support features 181 through 183 of different levels. Here, it would be understood that the pooling operation is performed to reduce (convert) the result of the convolution operation to scalar values. In some cases, the weight 184, 185 or 186 for each feature level may be calculated by further performing an operation such as softmax after the pooling operation. As described above, weight parameters of a convolution filter used in the convolution operation may be trained together with the segmentation model (i.e., trained by a prediction error for a query image).

Until now, the segmentation mask prediction operation S52 has been described with reference to FIGS. 15 through 18. Hereinafter, a subsequent operation will be described with reference to FIG. 5 again.

In operation S53, a segmentation model may be trained based on a prediction error for a segmentation mask of a query image. Specifically, as illustrated in FIG. 6, the segmentation system 10 may calculate a loss which is a difference between a predicted segmentation mask 66 and a correct segmentation mask 67 for a query image 65 and update weight parameters of the segmentation model by backpropagating the loss. For example, weight parameters (e.g., weight parameters of a convolution filter) of at least one of the feature extractor 71, the prototype generator 72, and the predictor 74 may be updated based on the calculated loss. A loss between the two segmentation masks 66 and 67 may be calculated based on, for example, a cross entropy function, but the scope of the present disclosure is not limited thereto.

In some embodiments of the present disclosure, predicting a segmentation mask of the support image 62 may be further performed, and the segmentation model may be additionally trained based on a loss between the predicted segmentation mask and a correct segmentation mask. The current embodiments will be further described below with reference to FIG. 19.

Figure 19:
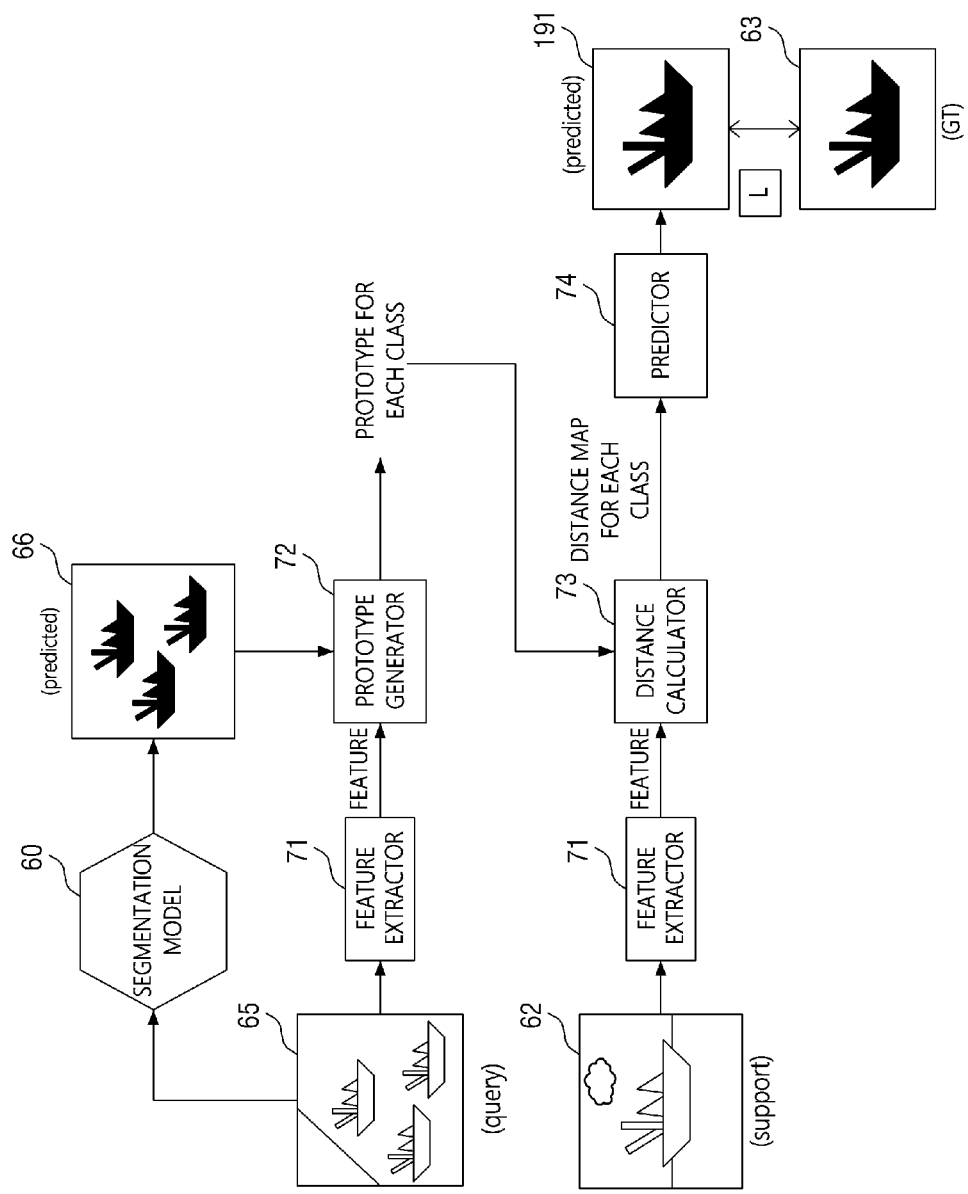
FIG. 19 is an example diagram for explaining a method of calculating a prediction error for a support image according to embodiments of the present disclosure.

As illustrated in FIG. 19, the segmentation system 10 may generate a prototype for each class for the query image 65 from the predicted segmentation mask 66 for the query image 65 through the prototype generator 72. This may be understood from the description of the process of generating a prototype for each class of the support image 62.

Next, the segmentation system 10 may predict a segmentation mask 191 for the support image 62 using the prototype for each class for the query image 65 and may additionally train the segmentation model 60 based on a prediction error (i.e., a difference between the predicted segmentation mask 191 and the correct segmentation mask 63 of the support image 62). The prediction error in this opposite direction may further improve the performance of the segmentation model 60.

In some embodiments, a weight given to the prediction error for the support image 62 may be smaller than a weight given to the prediction error for the query image 65. For example, the segmentation system 10 may calculate a final error through the weighted sum of the two prediction errors and train the segmentation model 60 using the calculated final error. Here, a smaller weight may be given to the prediction error for the support image 62. However, the scope of the present disclosure is not limited thereto.

Until now, the segmentation model training operation S32 has been described with reference to FIGS. 5 through 19. Hereinafter, a subsequent operation will be described with reference to FIG. 3 again.

In operation S33, semantic segmentation may be performed on an unlabeled image (set) of the target domain using the trained segmentation model. Here, a labeled image (set) of the target domain may be a support image, and an unlabeled image to be segmented may be a query image.

A detailed process of the semantic segmentation operation S33 will now be described with reference to FIGS. 20 and 21. For clarity of the present disclosure, any description overlapping the above description will be omitted.

Figure 20:
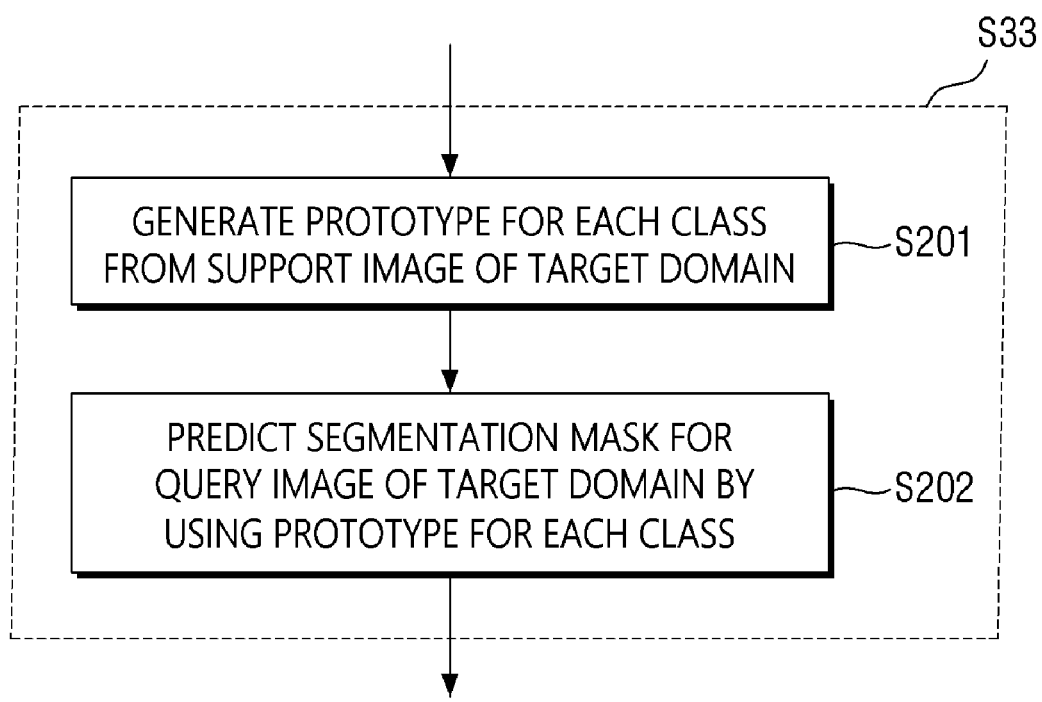
FIG. 20 is an example flowchart illustrating a detailed process of a semantic segmentation operation in FIG. 3.
Figure 21:
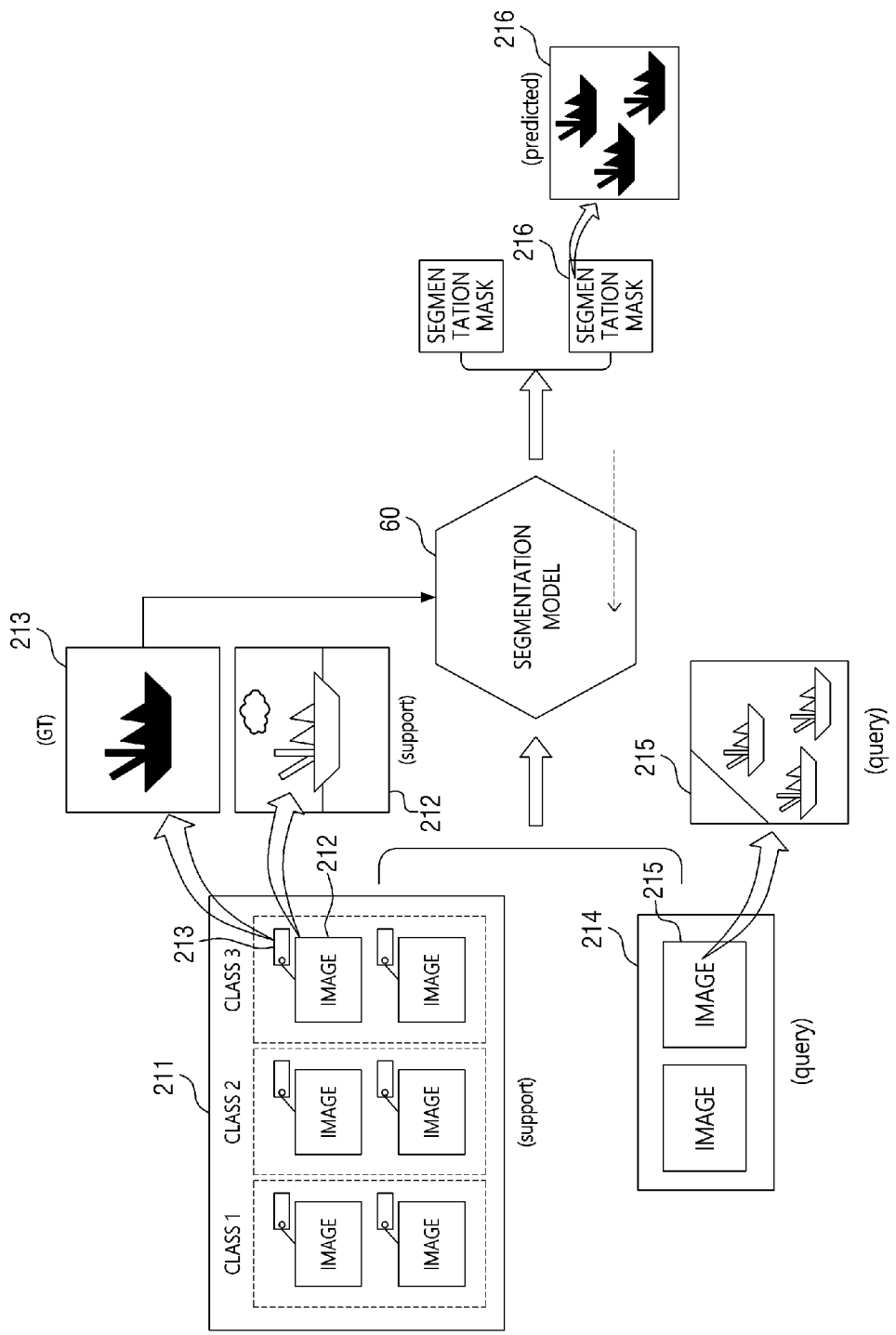
FIG. 21 is an example flow diagram for further explaining a detailed process of the semantic segmentation operation in FIG. 20.

FIG. 20 is an example flowchart illustrating a detailed process of operation S33.

As illustrated in FIG. 20, semantic segmentation of a query image (i.e., an unlabeled image) of a target domain may start with operation S201 in which a prototype for each class is generated from a support image (i.e., a labeled image) of the target domain. For example, as illustrated in FIG. 21, the segmentation system 10 may generate the prototype for each class by using a support image (e.g., 212) and a correct segmentation mask (e.g., 213) belonging to a support set 211 of the target domain. This may be understood from the above description of operation S51.

In some embodiments, a plurality of activation maps may be generated in a recursive manner for a support image of a source domain (i.e., a plurality of activation maps may be generated in a training operation), but only one activation map may be generated for a support image of the target domain (i.e., only one activation map may be generated in a prediction operation). For example, the prototype generator 72 may generate one activation map by performing a convolution operation on a support feature of a specific level (i.e., a feature extracted from the support image of the target domain) and may generate the prototype for each class by using only the activation map. The inventors of the present disclosure have found out that segmentation accuracy is sufficiently guaranteed even in this case.

In operation S202, a segmentation mask for a query image of the target domain may be predicted using the prototype for each class. This may be understood from the above description of operation S52.

Until now, the semantic segmentation method according to the embodiments of the present disclosure has been described with reference to FIGS. 3 through 21. According to the above description, a support set and a query set for training a segmentation model may be configured by sampling a plurality of labeled images belonging to a source domain. In addition, the segmentation model may be trained to predict a segmentation mask for a query image based on a distance between a prototype generated from a support image and a feature extracted from the query image. In this case, since the segmentation model learns to predict the segmentation mask for the query image by referring to the support image, a certain level of segmentation accuracy may be guaranteed through the trained segmentation model even in a target domain in which a small labeled image set exists.

In addition, multi-level features (i.e., a plurality of features having different abstraction levels) may be extracted from the support image, and prototypes for each class may be generated from the extracted multi-level features. Accordingly, a plurality of prototypes containing semantic information of different abstraction levels may be generated for each class, and the segmentation accuracy may be further improved by performing segmentation on the query image using the generated prototypes. For example, a low-level feature has a relatively small receptive field and contains semantic information of a relatively low level of abstraction. Therefore, if a prototype in which this feature is reflected is used, the segmentation accuracy for a narrow object region may be greatly improved.

Figure 22:
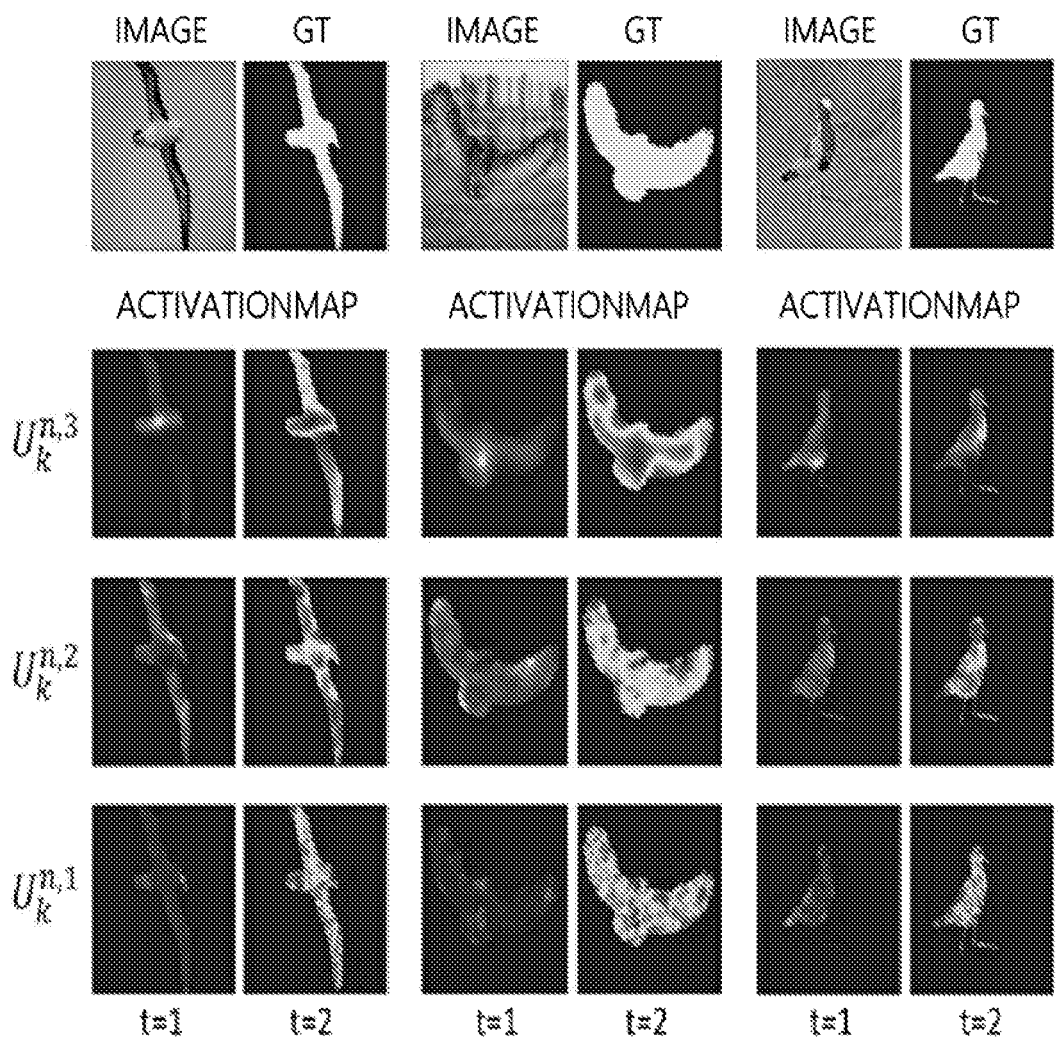
FIGS. 22 through 24 show experimental results of the semantic segmentation method according to the embodiments of the present disclosure.
Figure 23:
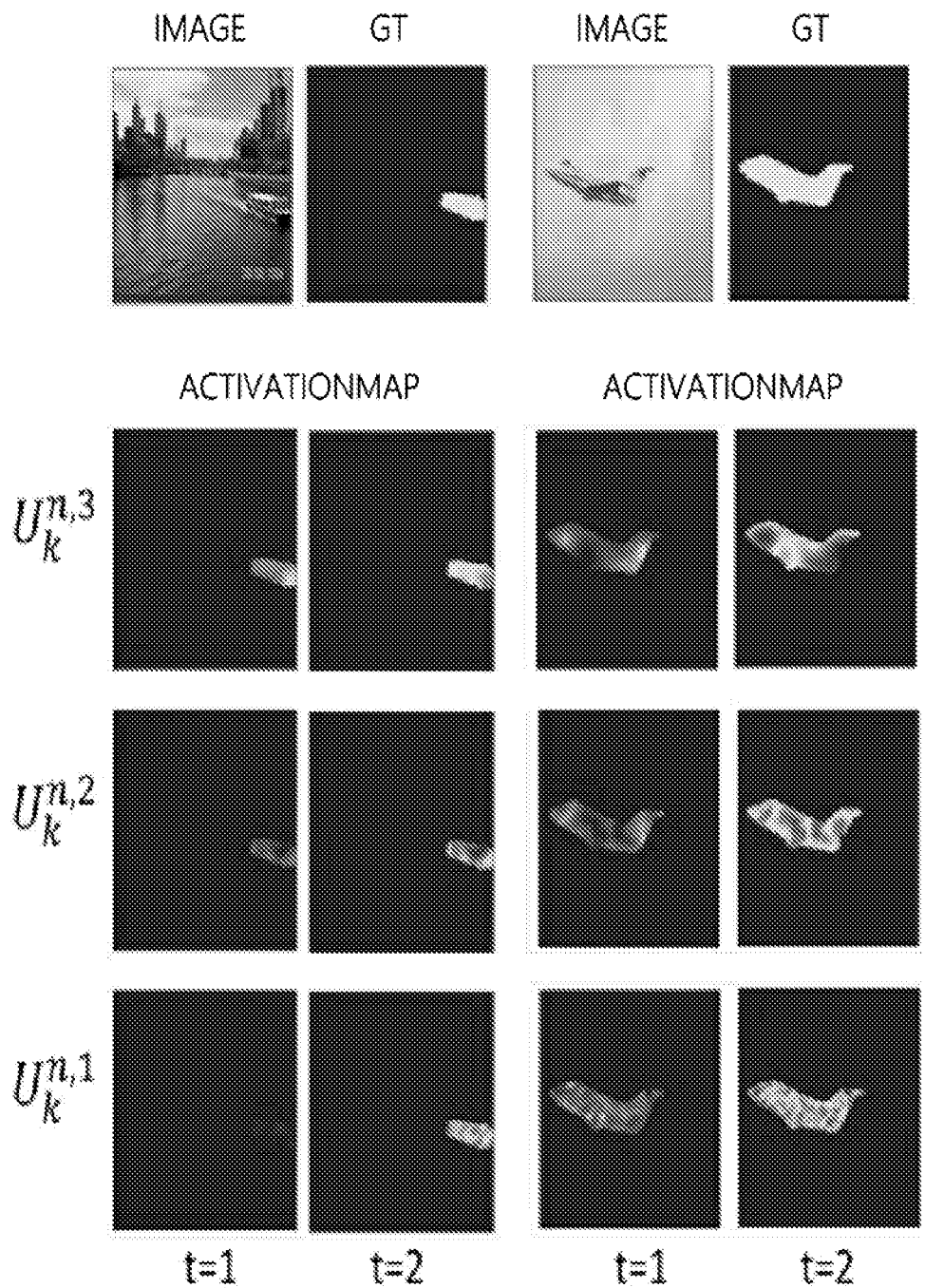
Figure 24:
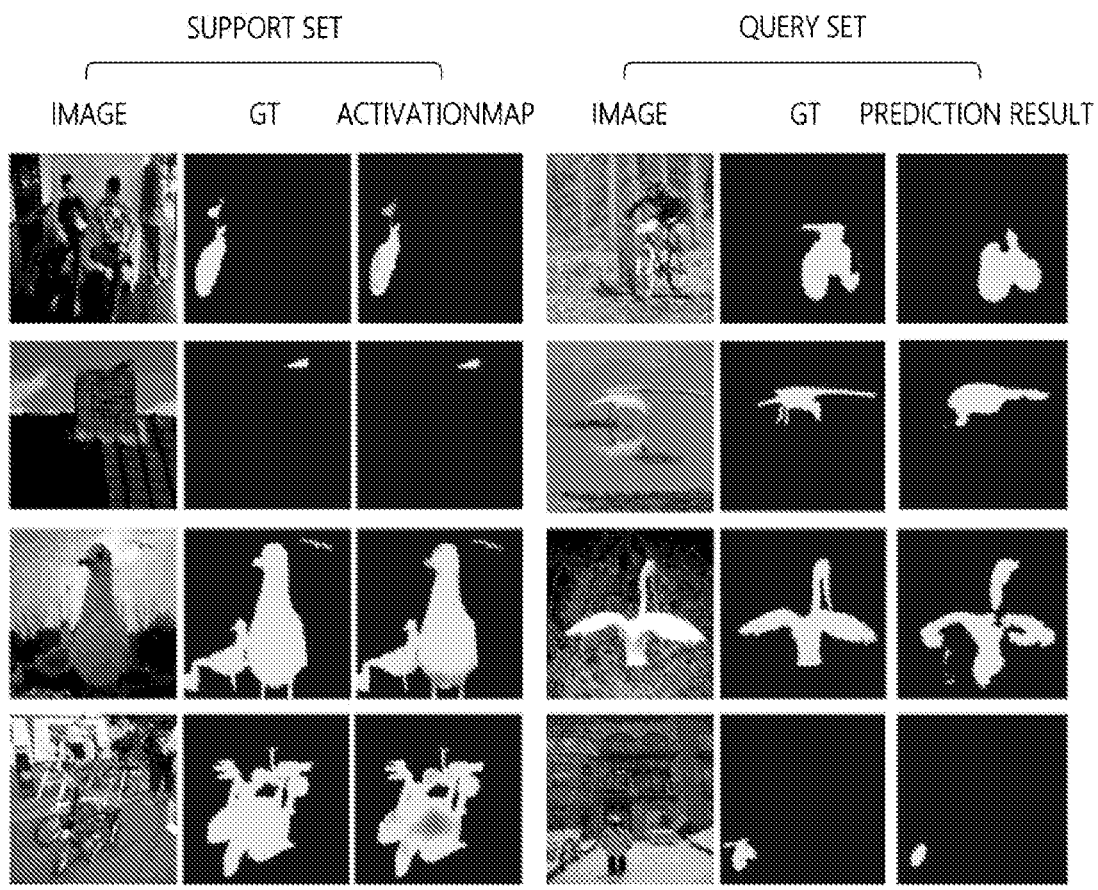

Experimental results of the above-described semantic segmentation method will now be briefly introduced with reference to FIGS. 22 through 24.

The present inventors conducted a semantic segmentation experiment in a few-shot environment to prove the accuracy of the above-described semantic segmentation method and the effect of related embodiments. Specifically, the present inventors built a segmentation model by generating a prototype for each class using features of three levels and two activation maps extracted in a recursive manner. Then, the present inventors performed segmentation on a query image of a target domain in the same way by using the built segmentation model. The results of the experiment are shown in FIGS. 22 through 25.

FIGS. 22 and 23 show a correct segmentation mask GT and activation maps for each support image. In FIGS. 22 and 23, $U^{n,1}$ through $U^{n,3}$ indicate activation maps extracted from low-level, mid-level and high-level support features, respectively, and activation maps (see 't=2') on the right are activation maps generated from activation maps (see 't=1') on the left.

As shown in FIGS. 22 and 23, activation regions of activation maps recursively generated from previous activation maps are partially different from those of the previous activation maps, are more focused on an important region, or are more precise.

FIG. 24 shows activation maps for a support set of a target domain and prediction results (i.e., predicted segmentation masks) for a query set. As shown, predicted segmentation masks for query images are very similar to correct segmentation masks. In particular, there is no significant difference even in narrow object regions. This means that a fairly high level of segmentation accuracy may be guaranteed even in a few-shot environment if prototypes for each class are generated using multi-level features and a plurality of activation maps generated in a recursive manner.

Until now, the experimental results of the above-described semantic segmentation method have been briefly introduced with reference to FIGS. 22 through 24. Hereinafter, an example computing device 250 that may implement the above-described segmentation system 10 will be described with reference to FIG. 25.

FIG. 25 illustrates the hardware configuration of a computing device 250.

Referring to FIG. 25, the computing device 250 may include one or more processors 251, a bus 253, a communication interface 254, a memory 252 which loads a computer program to be executed by the processors 251, and a storage 255 which stores a computer program 256. In FIG. 25, only the components related to the embodiments of the present disclosure are illustrated. Therefore, it will be understood by those of ordinary skill in the art to which the present disclosure pertains that other general-purpose components may be included in addition to the components illustrated in FIG. 25. That is, the computing device 250 may further include various components other than the components illustrated in FIG. 25. In addition, in some cases, some of the components illustrated in FIG. 25 may be omitted from the computing device 250. Each component of the computing device 250 will now be described.

The processors 251 may control the overall operation of each component of the computing device 250. The processors 251 may include at least one of a central processing unit (CPU), a micro-processor unit (MPU), a micro-controller unit (MCU), a graphic processing unit (GPU), and any form of processor well known in the art to which the present disclosure pertains. In addition, the processors 251 may perform an operation on at least one application or program for executing operations/methods according to embodiments of the present disclosure. The computing device 250 may include one or more processors.

Next, the memory 252 may store various data, commands and/or information. The memory 252 may load the computer program 256 from the storage 255 to execute operations/methods according to embodiments of the present disclosure. The memory 252 may be implemented as a volatile memory such as a random access memory (RAM), but the technical scope of the present disclosure is not limited thereto.

Next, the bus 253 may provide a communication function between the components of the computing device 250. The bus 253 may be implemented as various forms of buses such as an address bus, a data bus, and a control bus.

Next, the communication interface 254 may support wired and wireless Internet communication of the computing device 250. In addition, the communication interface 254 may support various communication methods other than Internet communication. To this end, the communication interface 254 may include a communication module well known in the art to which the present disclosure pertains.

Next, the storage 255 may non-temporarily store one or more programs 256. The storage 255 may include a non-volatile memory such as a read only memory (ROM), an erasable programmable ROM (EPROM), an electrically erasable programmable ROM (EEPROM) or a flash memory, a hard disk, a removable disk, or any form of computer-readable recording medium well known in the art to which the present disclosure pertains.

Next, the computer program 256 may include one or more instructions for controlling the processors 251 to perform operations/methods according to various embodiments of the present disclosure when the computer program 256 is loaded into the memory 252. That is, the processors 251 may perform the operations/methods according to the various embodiments of the present disclosure by executing the loaded instructions.

For example, the computer program 256 may include instructions for performing an operation of extracting a plurality of support features from a support image, an operation of generating a plurality of prototypes for a class associated with the support image based on the plurality of support features, and an operation of predicting a segmentation mask for a query image by using the prototypes. In this case, the segmentation system 10 according to the embodiments of the present disclosure may be implemented through the computing device 250.

Until now, an example computing device 250 that may implement the segmentation system 10 according to the embodiments of the present disclosure has been described with reference to FIG. 25.

In some embodiments, the computing device 250 illustrated in FIG. 25 may be a virtual machine implemented based on cloud technology. For example, the computing device 250 may be a virtual machine operating on one or more physical servers included in a server farm. In this case, at least some of the processors 251, the memory 252, and the storage 255 illustrated in FIG. 25 may be virtual hardware, and the communication interface 254 may also be a virtualized networking element such as a virtual switch.

So far, a variety of embodiments of the present disclosure and the effects according to embodiments thereof have been mentioned with reference to FIGS. 1 to 25. The effects according to the technical idea of the present disclosure are not limited to the aforementioned effects, and other unmentioned effects may be clearly understood by those skilled in the art from the description of the specification.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results may be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications may be made to the preferred embodiments without substantially departing from the principles of the present disclosure. Therefore, the disclosed preferred embodiments of the disclosure are used in a generic and descriptive sense only and not for purposes of limitation.

What is claimed is:

1. A semantic segmentation method performed by at least one computing device, the method comprising:
    extracting a plurality of support features, which comprise a first-level feature and a second-level feature, from a same support image;
    generating a plurality of prototypes for a class associated with the support image, based on the plurality of support features; and
    predicting a segmentation mask for a query image using the plurality of prototypes and not using a prototype generated from the query image,
    wherein the plurality of prototypes comprise a first prototype generated based on the first-level feature and a second prototype generated based on the second-level feature.

2. The method of claim 1, wherein the plurality of support features are extracted from layers of different depths of a convolutional neural network (CNN)-based feature extractor.

3. The method of claim 1, wherein the generating of the plurality of prototypes comprises generating the first prototype based on the first-level feature and a correct segmentation mask for the support image.

4. The method of claim 3, wherein the generating of the first prototype comprises:
    extracting an activation map of a specific class associated with the support image from the first-level feature; and
    generating the first prototype for the specific class by aggregating the activation map and the correct segmentation mask.

5. The method of claim 4, wherein the extracting of the activation map comprises:
    extracting a first activation map from the first-level feature;
    aggregating the first-level feature and the first activation map; and
    extracting a second activation map from a result of the aggregating,
    wherein the first prototype comprises a prototype generated based on the first activation map and a prototype generated based on the second activation map.

6. The method of claim 4, wherein the extracting of the activation map comprises extracting the activation map by performing a 1×1 convolution operation on the first-level feature.

7. The method of claim 3, wherein the generating of the first prototype comprises:
    extracting an activation map of a specific class associated with the support image from the first-level feature; and
    generating the first prototype for the specific class by aggregating the first-level feature, the activation map, and the correct segmentation mask.

8. The method of claim 1, wherein the first prototype and the second prototype are prototypes of a foreground class associated with the support image, and the generating of the plurality of prototypes comprises:
    generating a background segmentation mask from a correct segmentation mask for the support image; and
    generating a plurality of prototypes for a background class by aggregating each of the first-level feature and the second-level feature and the background segmentation mask.

9. The method of claim 1, wherein the predicting of the segmentation mask comprises:
    extracting a plurality of query features from the query image;
    generating a plurality of distance maps for the associated class by calculating distances between the plurality of query features and the plurality of prototypes; and
    predicting the segmentation mask based on the plurality of distance maps,
    wherein the plurality of distance maps comprise a first distance map generated based on the first prototype and a second distance map generated based on the second prototype.

10. The method of claim 9, wherein the predicting of the segmentation mask based on the plurality of distance maps comprises:
    generating an integrated distance map for the associated class by aggregating the distance maps for the associated class; and
    predicting the segmentation mask based on the integrated distance map.

11. The method of claim 10, wherein the first distance map and the second distance map are for a specific class associated with the support image, and the generating of the integrated distance map comprises:
    matching sizes of the first distance map and the second distance map and concatenating the first distance map and the second distance map in a channel direction; and
    generating an integrated distance map for the specific class based on the concatenated distance maps.

12. The method of claim 10, wherein the first distance map and the second distance map are for a specific class associated with the support image, and the generating of the integrated distance map comprises:
    calculating a first weight from the first-level feature;
    calculating a second weight from the second-level feature; and
    generating an integrated distance map for the specific class by aggregating the first distance map in which the first weight is reflected and the second distance map in which the second weight is reflected.

13. The method of claim 12, wherein the first weight is calculated by performing an operation on the first-level feature based on a first trainable parameter, the second weight is calculated by performing an operation on the second-level feature based on a second trainable parameter, and the first trainable parameter and the second trainable parameter are trained based on a prediction error for the query image.

14. The method of claim 1, wherein the plurality of prototypes are generated through a prototype generator, the segmentation mask is predicted through a predictor, and at least one of the prototype generator and the predictor is trained based on a prediction error for the query image.

15. The method of claim 14, wherein the support image and the query image are labeled images of a source domain in which correct segmentation masks exist, and
    wherein the method further comprises predicting a segmentation mask for a query image of a target domain by using the trained prototype generator, the trained predictor, and a support image of the target domain.

16. The method of claim 15, wherein at least some of classes belonging to the target domain do not exist in the source domain.

17. The method of claim 15, wherein a number of labeled images belonging to the target domain is less than a number of labeled images belonging to the source domain.

18. The method of claim 1, wherein the plurality of prototypes are generated based on the plurality of support features and a correct segmentation mask for the support image through a prototype generator,
wherein the predicting of the segmentation mask is performed through a predictor, and
wherein the method further comprises:
generating a plurality of prototypes for the query image from a plurality of query features extracted from the query image and the predicted segmentation mask through the prototype generator;
predicting a segmentation mask for the support image based on the plurality of prototypes for the query image through the predictor; and
training at least one of the prototype generator and the predictor based on a prediction error for the support image.

19. A semantic segmentation system comprising:
one or more processors; and
a memory configured to store one or more instructions,
wherein the one or more processors are configured to execute the stored one or more instructions to perform:
extracting a plurality of support features, which comprise a first-level feature and a second-level feature, from a same support image;
generating a plurality of prototypes for a class associated with the support image, based on the plurality of support features; and
predicting a segmentation mask for a query image using the plurality of prototypes and not using a prototype generated from the query image,
wherein the plurality of prototypes comprise a first prototype generated based on the first-level feature and a second prototype generated based on the second-level feature.

20. A non-transitory computer-readable recording medium storing computer program, which, when executable by at least one processor, causes the at least one processor to execute:
extracting a plurality of support features, which comprise a first-level feature and a second-level feature, from a same support image;
generating a plurality of prototypes for a class associated with the support image, based on the plurality of support features; and
predicting a segmentation mask for a query image using the plurality of prototypes and not using a prototype generated from the query image,
wherein the plurality of prototypes comprise a first prototype generated based on the first-level feature and a second prototype generated based on the second-level feature.

\* \* \* \* \*